United States Patent
Yokoyama et al.

(10) Patent No.: US 8,158,255 B2
(45) Date of Patent: Apr. 17, 2012

(54) PLATE-LIKE POLYCRYSTALLINE PARTICLE, METHOD FOR PRODUCING PLATE-LIKE POLYCRYSTALLINE PARTICLES, AND METHOD FOR PRODUCING CRYSTALLOGRAPHICALLY-ORIENTED CERAMIC

(75) Inventors: Shohei Yokoyama, Nagoya (JP); Nobuyuki Kobayashi, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 1122 days.

(21) Appl. No.: 12/017,567

(22) Filed: Jan. 22, 2008

(65) Prior Publication Data

US 2008/0206561 A1  Aug. 28, 2008

(30) Foreign Application Priority Data

Feb. 26, 2007  (JP) ................. 2007-045340
Jul. 13, 2007  (JP) ................. 2007-185036
Oct. 31, 2007  (JP) ................. 2007-283185

(51) Int. Cl.
  *B32B 5/66*  (2006.01)
(52) U.S. Cl. ............... 428/402; 428/403; 423/593.1; 156/89.11
(58) Field of Classification Search ............... 428/403, 428/402; 423/593.1; 156/89.11
  See application file for complete search history.

(56) References Cited

U.S. PATENT DOCUMENTS

| | | | | |
|---|---|---|---|---|
| 4,710,227 A | * | 12/1987 | Harley et al. | 149/47 |
| 5,089,455 A | * | 2/1992 | Ketcham et al. | 501/104 |
| 5,356,869 A | | 10/1994 | Capone et al. | |
| 6,093,338 A | | 7/2000 | Tani et al. | |
| 7,700,067 B2 | * | 4/2010 | Yokoyama et al. | 423/593.1 |
| 7,799,158 B2 | * | 9/2010 | Yokoyama et al. | 156/89.11 |
| 2004/0120881 A1 | | 6/2004 | Takao et al. | |
| 2006/0066180 A1 | * | 3/2006 | Nanataki et al. | 310/358 |

FOREIGN PATENT DOCUMENTS

| | | |
|---|---|---|
| EP | 1 457 471 A2 | 9/2004 |
| EP | 1 675 191 A1 | 6/2006 |
| EP | 1 675 192 A2 | 6/2006 |
| EP | 1675192 * | 6/2006 |
| JP | 10-330184 A1 | 12/1998 |
| JP | 11-060333 A1 | 3/1999 |
| JP | 2003-012373 A1 | 1/2003 |
| JP | 2004-189506 A1 | 7/2004 |
| JP | 2007-022857 A1 | 2/2007 |

OTHER PUBLICATIONS

Saito et al: "Synthesis of polycrystalline platelike KNbO3 particles . . . " JOECS, vol. 27,No. 13-15, Jan. 1, 2007.*
Yasuyoshi Saito et al., "*Synthesis of Polycrystalline Platelike KNbO₃ Particles by the Topochemical Micro-Crystal Conversion Method and Fabrication of Grain-Oriented ($K_{0.5}Na_{0.3}$) $NbO_3$ Ceramics*," Journal of the European Ceramic Society, Elsevier Science Publishers, Barking, Essex, GB, vol. 27, No. 13-15, Jan. 1, 2007, pp. 4087-4092.

* cited by examiner

*Primary Examiner* — Leszek Kiliman
(74) *Attorney, Agent, or Firm* — Burr & Brown

(57) ABSTRACT

A plate-like polycrystalline particle is produced by forming inorganic particles into a self-supported, sheet-like shaped body with a predetermined thickness, firing the shaped body, and crushing and classifying the fired shaped body by passing through a mesh having openings with a predetermined size. The inorganic particles are composed of an oxide having a perovskite structure and grow into crystal grains with an isotropic and polyhedral shape. Since grain growth in the thickness direction is limited and grain growth in the surface direction of the sheet is promoted, it is possible to obtain crystal grains having a high aspect ratio and a high degree of orientation. Therefore, in the plate-like polycrystalline particle, in most parts, the number of crystal grains present in the thickness direction of the particle at any one point is one, and a high aspect ratio and a high degree of orientation are achieved.

24 Claims, 8 Drawing Sheets

1A

1B

1C

2A

2B

4A

4B

PLATE-LIKE POLYCRYSTALLINE PARTICLE, METHOD FOR PRODUCING PLATE-LIKE POLYCRYSTALLINE PARTICLES, AND METHOD FOR PRODUCING CRYSTALLOGRAPHICALLY-ORIENTED CERAMIC

BACKGROUND OF THE INVENTION

1. Field of the Invention

The present invention relates to plate-like polycrystalline particles, methods for producing plate-like polycrystalline particles, and methods for producing crystallographically-oriented ceramics.

2. Description of the Related Art

To date, crystallographically-oriented ceramics whose piezoelectric properties are improved by increasing the degree of orientation of a specific crystal plane contained in the crystals have been proposed (for example, refer to Japanese Unexamined Patent Application Publication Nos. 11-60333 and 2003-12373). Furthermore, as the method for producing a crystallographically-oriented ceramic, a method has been proposed which includes a mixing step of mixing a host material A which has shape anisotropy and a guest material B which has crystal coherency with at least one crystal plane of the host material A and low crystal anisotropy, an orienting step of orienting a crystal plane of the host material A, and a firing step of heating the mixture to orient a crystal plane of the guest material B, and in which it is possible to obtain a ceramic with increased orientation even if the guest material B having low crystal anisotropy is used (for example, refer to Japanese Unexamined Patent Application Publication Nos. 2003-12373 and 10-330184). Furthermore, a method in which the orientation of a host material itself is increased by hydrothermal synthesis has been proposed (for example, refer to Japanese Unexamined Patent Application Publication No. 2007-22857).

SUMMARY OF THE INVENTION

However, in each of the methods described in Japanese Unexamined Patent Application Publication Nos. 11-60333, 2003-12373, and 10-330184, since the host material is a single crystal, it is not possible to easily change the particle diameter, the aspect ratio, or the like of the host material. Furthermore, in the production of the crystallographically-oriented ceramic, when the aspect ratio of the host material is increased in order to achieve an advantageous orientation during shaping, the primary particle diameter is also increased. When such a material is used, in some cases, sinterability may be decreased, the density of the crystallographically-oriented ceramic may be decreased, or the particle diameter may be increased, resulting in a decrease in mechanical strength, insulating properties, or the like. According to Japanese Unexamined Patent Application Publication No. 2003-12373, in a composition having a layered perovskite structure, after tabular crystals are obtained, by partially substituting the composition, a host material composed of desirable elements is synthesized. In some cases, the substitution reaction may not proceed sufficiently and undesirable elements may remain in the resulting material. Moreover, the process is cumbersome. Furthermore, according to Japanese Unexamined Patent Application Publication No. 2007-22857, since the host material is produced by hydrothermal synthesis in which an aqueous solution containing raw materials is subjected to high temperature and high pressure, the synthesis process is time-consuming.

The present invention has been achieved in consideration of the problems described above. An object of the invention is to provide plate-like polycrystalline particles in which the particle diameter and the aspect ratio can be easily adjusted, a method for producing plate-like polycrystalline particles, and a method for producing a crystallographically-oriented ceramic. Another object of the invention is to provide plate-like polycrystalline particles having a more homogeneous composition, a method for producing plate-like polycrystalline particles, and a method for producing a crystallographically-oriented ceramic. Another object of the invention is to provide plate-like polycrystalline particles in which the degree of orientation of crystals can be increased by simpler processing, a method for producing plate-like polycrystalline particles, and a method for producing a crystallographically-oriented ceramic.

In order to at least partially achieve the above-mentioned objects, the present inventors have made an attempt in which inorganic particles are formed into a self-supported, sheet-like shaped body with a thickness of 15 μm or less, the shaped body is fired with or without an inactive layer which does not substantially react with the shaped body being disposed adjacent to the shaped body, and the fired shaped body is crushed and classified by passing through openings with a predetermined size. As a result, it has been found that the particle or grain diameter and the aspect ratio of plate-like polycrystalline particles and crystal grains contained therein can be easily adjusted, and the degree of orientation of crystal grains can be increased by simpler processing. Thus, the present invention has been completed.

In an aspect of the present invention, a plate-like polycrystalline particle includes a plurality of crystal grains, wherein the number of crystal grains present in the thickness direction of the particle at any one point is substantially one, and the plurality of crystal grains are bonded together at grain boundaries with specific crystal planes being aligned.

In another aspect of the present invention, a method for producing plate-like polycrystalline particles each including a plurality of crystal grains includes a shaping step of forming inorganic particles into a self-supported, sheet-like shaped body with a thickness of 15 μm or less, a firing step of firing the shaped body with or without an inactive layer which does not substantially react with the shaped body being disposed adjacent to the shaped body, and a pulverizing step of crushing and classifying the fired shaped body by passing the fired shaped body through openings with a predetermined size.

In another aspect of the present invention, a method for producing a crystallographically-oriented ceramic includes a mixing step of mixing the plate-like polycrystalline particles according to the present invention and raw material powder, a second shaping step of forming the mixture into a predetermined secondary shaped body in which the plate-like polycrystalline particles are oriented in a predetermined direction, and a second firing step of firing the secondary shaped body so that the raw material powder is oriented in the direction in which the plate-like polycrystalline particles are oriented.

In the plate-like polycrystalline particles, the method for producing plate-like polycrystalline particles, and the method for producing the crystallographically-oriented ceramic according to the present invention, since inorganic particles are formed into a self-supported, sheet-like shaped body with a predetermined thickness, followed by firing, and the fired shaped body is crushed and classified by passing through openings with a predetermined size, it is possible to increase the degree of orientation of crystals by simpler processing.

Furthermore, each plate-like polycrystalline particle has a structure in which crystal grains are bonded together at grain boundaries, the number of crystal grains present in the thickness direction of the particle at any one point is substantially one, and the crystal grains can be easily separated by crushing at the grain boundaries. Therefore, the particle diameter and the aspect ratio can be easily adjusted. Furthermore, since it is not necessary to add an additive or the like or to involve a composition containing undesired elements, a more homogeneous composition can be obtained. Note that the expression "it is not necessary to add an additive or the like" does not exclude a case in which the degree of orientation is further increased by addition of an additive in the present invention.

DETAILED DESCRIPTION OF THE INVENTION

Figure 1:
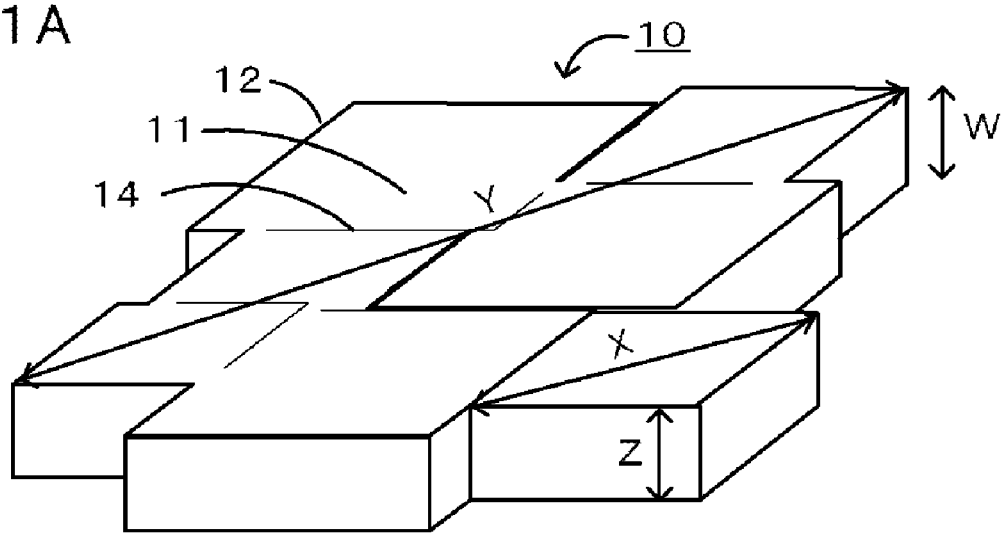
FIGS. 1A to 1C are schematic diagrams each showing an example of a plate-like polycrystalline particle.
Figure 1:
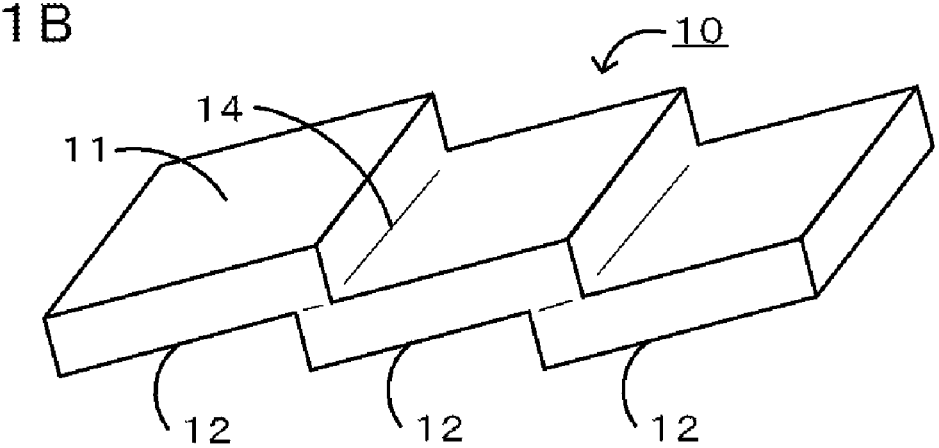
Figure 1:
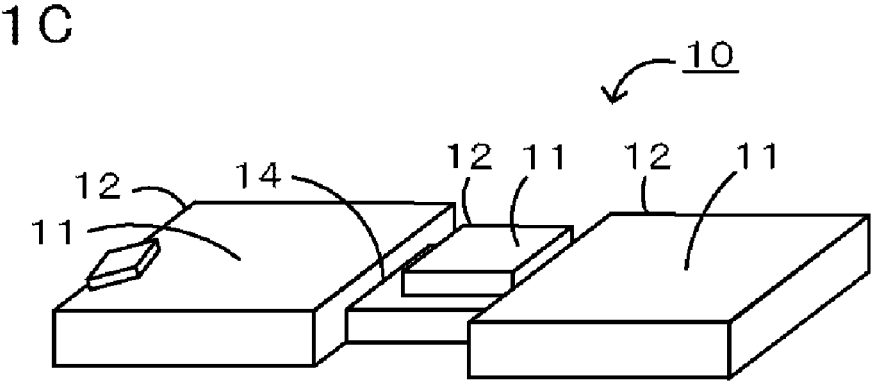

Plate-like polycrystalline particles according to the present invention will be described below with reference to the drawings. FIGS. 1A to 1C are schematic diagrams each showing an example of a plate-like polycrystalline particle according to an embodiment of the present invention. A plate-like polycrystalline particle 10 includes a plurality of crystal grains 12 having a specific crystal plane 11. The number of crystal grains 12 present in the thickness direction of the particle at any one point is substantially one, and the plurality of crystal grains 12 are bonded together at grain boundaries 14 with specific crystal planes 11 being aligned. That is, the plate-like polycrystalline particle 10 has a shape in which the plurality of crystal grains 12 are substantially two-dimensionally arranged with the specific crystal planes 11 being aligned. The expression "with the specific crystal planes 11 being aligned" refers, for example, to a case in which the crystal planes 11 of the plurality of crystal grains 12 lie on the same plane (FIG. 1A), a case in which the crystal planes 11 of the plurality of crystal grains 12 do not lie on the same plane, but the crystal planes 11 are oriented in the same direction (FIG. 1B), or a case in which most of the crystal planes 11 of the plurality of crystal grains 12 lie on the same plane although some crystal planes 11 are oriented in different directions, or the crystal planes 11 are oriented in the same direction although the crystal planes 11 do not lie on the same plane (FIG. 1C). The plate-like polycrystalline particles 10 are obtained by a method in which inorganic particles are formed into a sheet-like shaped body, the shaped body is fired to cause grain growth, and the fired shaped body is crushed. Hereinafter, for the sake of convenience, a green sheet-like shaped body is referred to as a "shaped body", the fired sheet-like shaped body is referred to as a "fired shaped body", and the particles having a specific particle size obtained by crushing and classifying the fired shaped body are referred to as "plate-like polycrystalline particles".

In the plate-like polycrystalline particle 10, the number of crystal grains present in the thickness direction of the particle at any one point is substantially one. The expression "the number of crystal grains present in the thickness direction of the particle at any one point is substantially one" means that even if crystal grains 12 overlap in some parts, in most parts, crystal grains 12 do not overlap and the number of crystal grains 12 present in the thickness direction of the particle at any one point is only one. This does not cover the case where in some parts of the plate-like polycrystalline particle 10, such as in the center region, two or more crystal grains 12 may overlap and be bonded with each other, and in the end region, the number of crystal grains present in the thickness direction of the particle at any one point is one. In the plate-like polycrystalline particle 10, since the material present in the thickness direction of the particle is limited, when grain growth occurs due to firing or the like, the number of crystal grains 12 present in the thickness direction of the particle at any one point is substantially one, and grain growth is promoted in the surface direction rather than the thickness direction of the particle. Therefore, flat crystal grains 12 are arranged in the surface direction of the particle and the specific crystal plane 11 is oriented in a preferred direction. In the plate-like polycrystalline particles 10, as shown in FIGS. 1B and 1C, crystal grains 12 may overlap or the crystal planes 11 may be oriented in different directions locally in some parts because crystal grains 12 do not reach the extremity of the thickness direction of the sheet-like shaped body during grain growth or crystal planes 11 are oriented in different directions. However, generally, a plurality of crystal grains 12 with crystal planes 11 oriented in the same direction are bonded together at grain boundaries. In the plate-like polycrystalline particle 10, the percentage of the portion which includes only one crystal grain 12 in the thickness direction at any one point is preferably 70% or more, more preferably 80% or more, and most preferably 90% or more, in terms of area ratio. The area ratio is determined by a method in which electron microscope observation (SEM observation) is performed in a state where plate-like polycrystalline particles 10 are dispersed as much as possible, and the ratio of the area contained in the SEM photograph is calculated. Furthermore, it is also possible to estimate the area of the portion which includes only one crystal grain 12 in the thickness direction at any one point from the total area of crystal grains whose length in the surface direction is larger than the thickness. In the plate-like polycrystalline particle 10, the percentage of the portion in which crystal grains 12 overlap is a fraction of the whole (e.g., 30% or less in terms of area ratio), and at grain boundaries 14 where crystal grains 12 are bonded together, such a portion can be relatively easily separated by crushing.

In the plate-like polycrystalline particle 10 of the present invention, the length Y in the longitudinal direction of the plate-like polycrystalline particle 10 (refer to FIG. 1A) can be set at 1.0 mm or less, 50 μm or less, or 20 μm or less. The length Y can be changed appropriately according to the size of the intended plate-like polycrystalline particle 10. The ratio of the length Y in the longitudinal direction of the plate-like polycrystalline particle 10 to the thickness W of the plate-like polycrystalline particle 10, i.e., the aspect ratio (Y/W) of the plate-like polycrystalline particle 10 is preferably 2 to 100. For example, when the plate-like polycrystalline particles 10 are used as a raw material for producing a crystallographically-oriented ceramic, at an aspect ratio of the plate-like polycrystalline particle 10 of 2 or more, orientation can be easily performed during shaping, and crystallographic orientation can be increased. At an aspect ratio of 100 or less, for example, in the mixing step of the method for producing a crystallographically-oriented ceramic, which will be described below, pulverization is not easily performed, and the aspect ratio can be maintained. Consequently, it is possible to easily obtain a shaped body in which the plate-like polycrystalline particles 10 are oriented in a preferred direction. The thickness W of the plate-like polycrystalline particle 10 is defined as the length at the thickest portion of the plate-like polycrystalline particle 10. The thickness W of the plate-like polycrystalline particle 10 is preferably 15 μm or less, more preferably 10 μm or less, still more preferably 5 μm or less, and most preferably 2 μm or less. The thickness W is preferably 0.1 μm or more. If the thickness W is 0.1 μm or more, a planar plate-like polycrystalline particle 10 can be easily formed. If the thickness W is 15 μm or less, the degree of orientation can be increased. The thickness W of the plate-like polycrystalline particle 10 is usually substantially the same as the thickness Z of the crystal grain 12. The aspect ratio of the plate-like polycrystalline particle 10 is determined by the method described below. First, a SEM photograph is taken by a scanning electron microscope, and the thickness W of the plate-like polycrystalline particle 10 is determined from the SEM photograph. Then, the plate-like polycrystalline particles 10 are placed in a solvent, such as an alcohol, in an amount of 1% to 10% by weight, and dispersed, for example, using an ultrasonic wave for 30 minutes. The dispersion liquid is dispersed on a glass substrate in the form of a thin layer by spin-coating at 1,000 to 4,000 rpm such that the plate-like polycrystalline particles 10 are prevented from overlapping each other as much as possible and that the crystal planes included in the plate-like polycrystalline particles 10 are parallel to the surface of the substrate. SEM observation is performed in such a state. In a field of view which includes about 5 to 30 plate-like polycrystalline particles 10, the crystal planes of the plate-like polycrystalline particles 10 are observed. The longest length Y of each plate-like polycrystalline particle 10 is determined from the SEM photograph taken. At this stage, overlapping plate-like polycrystalline particles 10 can be ignored. Assuming that the longest length Y is a particle diameter of each plate-like polycrystalline particle 10, the particle diameter is divided by the thickness W of the plate-like polycrystalline particle 10 to calculate the aspect ratio for each plate-like polycrystalline particle 10. The average value of the individual plate-like polycrystalline particles 10 is considered as the aspect ratio of the plate-like polycrystalline particle 10.

In the plate-like polycrystalline particle 10 of the present invention, the degree of orientation of the specific crystal plane 11 measured by the Lotgering method is preferably 25% or more, more preferably 30% or more, and most preferably 60% or more. The degree of orientation of 25% or more is sufficient, for example, to obtain a crystallographically-oriented ceramic by allowing the plate-like polycrystalline particles 10 to have a secondary orientation. If the degree of orientation is 60% or more, higher properties can be obtained. The specific crystal plane 11 may be the pseudocubic (100) plane in the surface of the fired shaped body. The term "pseudocubic (100)" means that although an isotropic perovskite-type oxide has a structure, such as a tetragonal, rhombic, or trigonal structure, which is slightly distorted from the cubic structure, since the amount of distortion is very small, the pseudocubic structure is considered to be a cubic structure and designated by the Miller indices. Here, in the measurement of the degree of orientation by the Lotgering method, the plate-like polycrystalline particles 10 are placed on a substrate as a sample holder such that the crystal planes 11 contained in the plate-like polycrystalline particles 10 are directed in a uniform direction as much as possible, and XRD diffraction patterns are measured. The degree of orientation is obtained using equation (1) below. The XRD diffraction patterns are measured by carrying out the same step as that of adjusting a sample in the SEM observation when the aspect ratio is determined as described above. That is, the plate-like polycrystalline particles 10 are dispersed in the form of a thin layer such that the plate-like polycrystalline particles 10 are prevented from overlapping each other as much as possible and that the crystal planes 11 contained in the plate-like polycrystalline particles 10 are parallel to the surface of a substrate made of glass or the like, and measurement is performed in such a state. It is preferable to confirm by SEM observation or the like if most of the plate-like polycrystalline particles 10 are dispersed. In equation (1), $\Sigma I(HKL)$ is the sum of X-ray diffraction intensities of all crystal planes (hkl) measured in the plate-like polycrystalline particle; $\Sigma I_0(hkl)$ is the sum of X-ray diffraction intensities of all crystal planes (hkl) measured in a non-oriented plate-like polycrystalline particle having the same composition as the plate-like polycrystalline particle; $\Sigma' I(HKL)$ is the sum of X-ray diffraction intensities of crystallographically equivalent specific crystal planes (e.g., (100) plane) measured in the plate-like polycrystalline particle; and $\Sigma' I_0(HKL)$ is the sum of X-ray diffraction intensities of specific crystal planes measured in a non-oriented plate-like polycrystalline particle having the same composition as the plate-like polycrystalline particle.

$$\text{Degree of orientation} = \frac{\frac{\Sigma' I(HKL)}{\Sigma I(hkl)} - \frac{\Sigma' I_0(HKL)}{\Sigma I_0(hkl)}}{1 - \frac{\Sigma' I_0(HKL)}{\Sigma I_0(hkl)}} \times 100\%$$

In the plate-like polycrystalline particle 10 of the present invention, the thickness Z of the crystal grains 12 is preferably 15 μm or less, more preferably 10 μm or less, still more preferably 5 μm or less, and most preferably 2 μm or less. The thickness Z is preferably 0.1 μm or more. If the thickness Z is 0.1 μm or more, a planar plate-like polycrystalline particle 10 can be easily formed. If the thickness Z is 15 μm or less, the degree of orientation can be further increased. If the thickness Z is 15 μm or less, even if inorganic particles that grow into crystal grains with an isotropic and polyhedral shape are included, since the grain growth in the thickness direction is limited and grain growth is more promoted in the surface direction of the plate-like polycrystalline particle 10, a specific crystal plane grows in the surface of the plate-like polycrystalline particle 10, and thus the aspect ratio and the degree of orientation are increased.

In the plate-like polycrystalline particle 10 of the present invention, the ratio of the length X in the crystal plane 11 direction of the crystal grain 12 to the thickness Z of the crystal grain 12 (refer to FIG. 1A), i.e., the aspect ratio (X/Z) of the crystal grain 12, is preferably 1 or more, more preferably 2 or more, and still more preferably 4 or more. If the aspect ratio is 2 or more, since the crystal grains 12 are easily oriented, the degree of orientation of the plate-like polycrystalline particle 10 is also increased. The aspect ratio is preferably 50 or less. If the aspect ratio is 50 or less, the size of the plate-like polycrystalline particle 10 can be easily adjusted. The aspect ratio of the crystal grain 12 is determined by the method described below. First, a SEM photograph is taken by a scanning electron microscope, and the thickness Z of the crystal grain 12 is determined from the SEM photograph. Then, as in the determination of the aspect ratio of the plate-like polycrystalline particle 10, SEM observation is performed in a state where the plate-like polycrystalline particles 10 are dispersed in the form of a thin layer such that the plate-like polycrystalline particles 10 are prevented from overlapping each other as much as possible. In a field of view which includes about 20 to 40 crystal grains 12, the crystal planes of the plate-like polycrystalline particles 10 are observed. The longest length X of the crystal plane 11 of each crystal grain 12 is determined from the SEM photograph taken. At this stage, overlapping plate-like polycrystalline particles 10 can be ignored. Assuming that the longest length X is a grain diameter of the crystal gain 12, the grain diameter is divided by the thickness Z of the crystal grain 12 to calculate the aspect ratio for each crystal grain 12. The average value of the individual crystal grains 12 is considered as the aspect ratio of the crystal grains 12 contained in the plate-like polycrystalline particle 10.

In the plate-like polycrystalline particle 10 of the present invention, the length X in the crystal plane 11 direction of the crystal grain 12 is preferably 50 μm or less, more preferably 25 μm or less, and most preferably 20 μm or less. If the length X is 50 μm or less, the size of the plate-like polycrystalline particle 10 can be easily adjusted.

The ratio of the length Y in the longitudinal direction of the plate-like polycrystalline particle 10 to the length X in the crystal plane direction of the crystal grain 12, i.e., Y/X, is preferably 3 to 100. For example, when the plate-like polycrystalline particles 10 are used as a raw material for producing a crystallographically-oriented ceramic, if the Y/X is 3 or more, the aspect ratio of the plate-like polycrystalline particles 10 can be increased, and thus crystallographic orientation can be increased. If the Y/X is 100 or less, since the grain index of the plate-like polycrystalline particles 10 contained in the crystallographically-oriented ceramic decreases, orientation is easily performed and the crystallographically-oriented ceramic can be easily molded.

In the plate-like polycrystalline particle 10 of the present invention, the crystal grains 12 may be composed of inorganic particles that grow into crystal grains with an isotropic and polyhedral shape, or may be composed of inorganic particles that grow into crystal grains with an anisotropic shape. The fact that the inorganic particles grow into crystal grains with an isotropic and polyhedral shape suggests the possibility that a specific crystal plane may be grown depending on the situation. Here, even if inorganic particles that grow into crystal grains with an isotropic and polyhedral shape are included, since grain growth in the thickness direction is limited and grain growth is more promoted in the surface direction, crystal grains in which the preferred direction of crystal growth is in the surface direction take in crystal grains in which the preferred direction of crystal growth is not in the surface direction, etc. Thus, crystal growth selectively proceeds in the surface direction, and the aspect ratio and the degree of orientation are increased. Among the polyhedral shapes, a hexahedral shape is preferred. In the case of a hexahedron, when a plate-like shape is formed, in grains having faces parallel to two large surfaces of the plate-like shape (also referred to as the sheet surfaces), four faces other than the two faces are included as the growing planes in all directions in a shaped body. When grain growth occurs isotropically, the two faces present in the sheet surfaces expand naturally. Consequently, it is possible to easily obtain grains having a large aspect ratio, which is preferable. Furthermore, the crystal grains 12 are preferably composed of an oxide having a perovskite structure. In some oxides having the perovskite structure, grains grow into a pseudocubic structure in the shape of a dice. The (100) plane (or (001) plane) grows along the surface of the shaped body and the (100) crystal plane (or (001) plane) is easily oriented in a direction perpendicular to the sheet surface, which is preferable. The crystal grains 12 contained in the plate-like crystal particle 10 may be anisotropic or isotropic, but preferably is anisotropic.

In the plate-like polycrystalline particle 10 of the present invention, preferably, the crystal grains 12 include an oxide represented by general formula $ABO_3$ as a main component, wherein the A site contains at least one element selected from the group consisting of Li, Na, K, Bi, and Ag, and the B site contains at least one element selected from the group consisting of Nb, Ta, and Ti. Particularly preferably, the oxide is $(Li_XNa_YK_Z)Nb_MTa_NO_3$, $(Bi_XNa_YK_ZAg_N)TiO_3$, or the like (wherein X, Y, Z, M, and N are arbitrary numbers). Thereby, at a predetermined thickness (e.g., 15 μm or less), crystal grains which have a large aspect ratio and in which a specific crystal plane is grown are easily obtained. The crystal grains 12 may contain an element other than those described above. Here, in the crystal grains 12 before firing (i.e., before the firing step which will be described below), the A/B is preferably 1.0 to 1.1. In the oxide represented by general formula $ABO_3$, when the A/B is in the range of 1.0 to 1.1, the aspect ratio and the degree of orientation can be increased. Examples of the oxide represented by general formula $ABO_3$ have been described above. Other examples that can be used in the present invention include an oxide, such as $Al_2O_3$, $ZrO_2$, $TiO_2$, MgO, CaO, $Y_2O_3$, $SnO_2$, ZnO, or $SiO_2$; a compound oxide, such as PZT, $BaTiO_3$, $BiFeO_3$, or $YBa_2Cu_3O_7$; a nitride, such as AlN, $Si_3N_4$, or BN; a boride, such as $CaB_6$, $MgB_2$, or $LaB_6$; a carbide, such as TiC, SiC, or WC; a tellurium compound, such as $Bi_2Te_3$, $Bi_2Sb_8Te_{15}$, or PbTe; a silicide-based material, such as $CrSi_2$, $MnSi_{1.73}$, $FeSi_2$, or $CoSi_2$; and a metal, an alloy, an intermetallic compound, or the like. Alternatively, the crystal grains may include an oxide represented by general formula $ABO_3$ as a main component, wherein the A site contains Pb, and the B site contains at least one element selected from the group consisting of Mg, Zn, Nb, Ni, Ti, and Zr.

A method for producing the plate-like polycrystalline particles 10 will now be described. A method for producing plate-like polycrystalline particles according to the present invention includes (1) a preparation step of inorganic particles which are raw materials for a plate-like polycrystalline particle, (2) a shaping step of forming the inorganic particles into a sheet-like shaped body, (3) a firing step of the shaped body, and (4) a pulverizing step of the fired shaped body using a mesh. The individual steps will be described below in that order.

(1) Preparation Step of Inorganic Particles

Examples of inorganic particles that can be used for the plate-like polycrystalline particles 10 include inorganic particles that grow into crystal grains with an anisotropic shape under predetermined firing conditions, namely, the growth form under predetermined firing conditions is crystal grains with an anisotropic shape; and inorganic particles that grow into crystal grains with an isotropic and polyhedral shape under predetermined firing conditions, namely, the growth form under predetermined firing conditions is crystal grains with an isotropic and polyhedral shape. In the present invention, since a sheet-like shaped body with a thickness of 15 μm or less is fired to cause grain growth, grain growth in the thickness direction of the shaped body is limited, and grain growth is more promoted in the surface direction of the shaped body. Therefore, it is possible to form a plate-like polycrystalline particles 10 using inorganic particles that grow into crystal grains with an isotropic and polyhedral shape, for example, a cube. Here, the expression "growth form under predetermined firing conditions" is defined as the morphology observed when crystals of inorganic particles come to equilibrium with each other under given heat-treating conditions, which is, for example, obtained by observing the shape of grains at the surface at a bulk surface when it is crystallized by firing. Furthermore, the term "anisotropic shape" refers to a shape in which the ratio of major axis length to minor axis length (aspect ratio) is large (e.g., with an aspect ratio of 2 or more), such as a tabular, strip-like, columnar, needle-like, or flake-like shape. Furthermore, the "isotropic and polyhedral" shape means, for example, a cubic shape. In general, with respect to the morphology of crystal grains formed by grain growth, if the grain growth temperature is sufficiently low, for example, 400° C. or less, compared with the melting point or decomposition temperature of the solid, the crystal grains are virtually spherically-shaped. In spite of the fact that intrinsically, the atom arrangement is anisotropic and the growth rate differs depending on the crystal plane, grains grow into a spherical shape. The reason for this is that atoms of solids are very difficult to move. On the other hand, if the grain growth temperature is close to the melting point or decomposition temperature of the solid, for example, if the difference in temperature is 200° C. or less, the movement of atoms at the surface of growing grains becomes active, and surface morphology resulting from the crystal structure appears. That is, as grains grow, a difference occurs in the growth rate depending on the crystal plane. Slowly growing crystal planes develop, while rapidly growing crystal planes diminish or disappear. The morphology determined by the difference in plane growth rate is referred to as the growth form. In order to achieve an anisotropic shape or polyhedral shape as the growth form, in addition to the material in which grain growth temperature is close to the melting point or decomposition temperature of the solid as described above, a system in which a low-melting-point compound, such as glass, is added as a flux and grains are grown through the flux is preferably selected. The reason for this is that by adding the flux, the movement of elements constituting the solid at the surface of grains becomes active. As the inorganic particles that grow into a polyhedral shape, inorganic particles that grow into a hexahedral shape can be used. In the case of a hexahedron, in grains having two faces parallel to the surface of the planar sheet, four faces other than the two faces are included as the growing planes in all directions in a shaped body. When grain growth occurs isotropically, the two faces present in the surfaces of the sheet expand naturally. Consequently, it is possible to easily obtain grains having a large aspect ratio, which is preferable. For the same reason, a columnar shape, such as a hexagonal columnar shape or octagonal columnar shape, may also be used. Additionally, in order to obtain crystal grains having a large aspect ratio, an additive which accelerates grain growth may be used. Preferably, the inorganic particles form an oxide having a perovskite structure. Furthermore, preferably, crystals formed after firing are composed of an oxide represented by general formula $ABO_3$, wherein the A site contains at least one element selected from the group consisting of Li, Na, K, Bi, and Ag, and the B site contains at least one element selected from the group consisting of Nb, Ta, and Ti. For example, when inorganic particles which form $NaNbO_3$ in which part of the A site is replaced with Li, K, or the like and part of the B site is replaced with Ta or the like, i.e., $(Li_XNa_YK_Z)Nb_MTa_NO_3$ (wherein X, Y, Z, M, and N are arbitrary numbers), are used, the growth form at 900° C. to 1,300° C. is a cubic shape, which is preferable. An element other than those described above may be added. Furthermore, in inorganic particles which form crystals having $(Bi_{0.5}Na_{0.5-x}K_x)TiO_3$ as a main component, when X>0.01, the growth form is a cubic shape, which is preferable. Furthermore, inorganic particles which form crystals including an oxide represented by general formula $ABO_3$, wherein the A site contains Pb as a main component and the B site contains at least one element selected from the group consisting of Mg, Zn, Nb, Ni, Ti, and Zr are also preferable. Furthermore, when glass having a melting point of 1,000° C. or lower, such as lead borate glass, zinc borate glass, borosilicate glass, lead silicate glass, zinc silicate glass, or bismuth silicate glass, is added as a flux in an amount of 0.1% by weight or more, the growth form at 900° C. to 1,300° C. is more likely to be a cubic shape, which is preferable. In this case, in view of dispersibility of glass, preferably, instead of forming glass powder directly into a sheet, the glass powder is calcined so as to be dispersed sufficiently, the calcined material is pulverized, and using the pulverized powder, the shaped body is formed. When inorganic particles which form an oxide represented by general formula $ABO_3$ are used, preferably, raw materials are prepared such that the ratio of the A site to the B site, A/B, will be 1.0 to 1.1. When the A/B is in the range of 1.0 to 1.1, it is possible to increase the aspect ratio and the degree of orientation of crystals contained in the fired plate-like polycrystalline particles. Furthermore, preferably, the A/B is in the range of 1.0 to 1.1 in view of compensation of an alkaline component, lead component, or the like that volatilizes during firing. In the case where crystal grains 12 are obtained from the resulting fired shaped body, if the A/B is in the range of 1.0 to 1.1, there is a possibility that the alkali-rich phase present in grain boundaries is dissolved when the fired shaped body is placed in water, and the crystal grains are separated into individual grain units easily, which is preferable. Furthermore, when the thickness of the shaped sheet is very small, for example, 3 µm or less, or when the atmosphere (vapor of the alkaline component, lead component, or the like) in the sheath during firing is thin, the change in the composition may increase due to volatilization of the alkaline component, lead component, or the like from the shaped sheet during firing. Therefore, the A/B in a range of 1.1 to 1.3 is also preferable.

In the preparation step of inorganic particles, preferably, raw materials for the inorganic particles are pulverized and mixed, the mixed powder is calcined, and the resulting inorganic particles are further pulverized. As the raw materials for the inorganic particles, oxides, hydroxides, carbonates, sulfates, nitrates, tartrates, or the like of the desired components may be used. Preferably, oxides and carbonates are mainly used. In the pulverization of the inorganic particles, the particle diameter is preferably set according to the thickness of the shaped body. The median diameter (D50) of the inorganic particles is preferably 1% to 60% of the thickness of the shaped body. If the median diameter is 1% or more of the thickness of the shaped body, pulverization can be easily performed. If the median diameter is 60% or less of the thickness of the shaped body, the thickness of the shaped body can be easily adjusted because the particles in the shaped body are more homogeneously distributed. Furthermore, in order to increase the size of the crystal grains 12, preferably, the median diameter (D50) of the inorganic particles is decreased from the standpoint of promoting grain growth. The particle diameter is determined using a method in which inorganic particles are dispersed in a dispersion medium (organic solvent, water, or the like), and the particle diameter is measured using a laser diffraction/scattering particle size distribution analyzer. The pulverization of the inorganic particles is preferably conducted by wet pulverization. For example, a ball mill, a bead mill, a trommel, an attritor, or the like may be used.

(2) Shaping Step of Forming Shaped Body

The inorganic particles are formed into a self-supported, sheet-like shaped body with a thickness of 15 μm or less. Note that the "self-supported shaped body" includes a shaped body that alone can maintain the shape of a sheet-like shaped body, and also includes a shaped body that alone cannot maintain the shape of a sheet-like shaped body but that has been bonded or formed on a substrate and separated from the substrate before or after firing. The shaped body can be formed, for example, by a doctor-blade method using a slurry containing the inorganic particles, or extrusion molding using a puddle containing the inorganic particles. When the doctor-blade method is used, for example, a slurry is applied to a flexible plate (e.g., organic polymer plate, such as PET film), the applied slurry is solidified by drying to form a shaped body, and the shaped body is separated from the plate. Thereby, a shaped body of the plate-like polycrystalline particles before firing may be obtained. When a slurry or a puddle is prepared before shaping, the inorganic particles may be dispersed in an appropriate dispersion medium, and a binder, a plasticizer, or the like may be appropriately added thereto. The slurry is preferably adjusted so as to have a viscosity of 500 to 700 cP and is preferably defoamed under reduced pressure. The thickness of the shaped body is 15 μm or less, preferably 10 μm or less, and more preferably 5 μm or less, and most preferably 2 μm or less. At 15 μm or less, a high degree of orientation of the crystal grains 12 can be obtained, and at 10 μm or less, a higher degree of orientation of the crystal grains 12 can be obtained. The thickness of the shaped body is preferably 0.1 μm or more. If the thickness of the shaped body is 0.1 μm or more, a self-supported, sheet-like shaped body can be easily formed. In order to relatively increase the size of the crystal grains 12, preferably, the thickness of the shaped body is set at about 5 to 10 μm. The thickness of the sheet-like shaped body is substantially equal to the thickness of the plate-like polycrystalline particles 10, and also relates to the grain diameter of the crystal grains 12. Therefore, the thickness of the sheet-like shaped body is appropriately set according to the application of the plate-like polycrystalline particles 10. Examples of other shaping methods that may be used include high-speed spraying of particles, such as aerosol deposition; and a method in which a film is formed on a substrate made of a resin, glass, ceramic, metal, or the like by a vapor-phase method, such as sputtering, CVD, or PVD, and then the film is separated from the substrate to obtain a shaped body of the plate-like polycrystalline particles before firing. In this case, since the density of the shaped body before firing can be increased, grain growth proceeds at low temperature, volatilization of constituent elements can be prevented, and the resulting plate-like polycrystalline particles have high density, all of which are advantageous.

(3) Firing Step of Shaped Body

The shaped body obtained in the shaping step is fired with or without an inactive layer which does not substantially react with the shaped body (e.g., fired ceramic plate, Pt plate, carbon plate, graphite plate, molybdenum plate, or tungsten plate) being disposed adjacent to the shaped body. For example, a method may be used in which a shaped body is disposed on an inactive layer and then firing is performed, the inactive layer being composed of alumina, zirconia, spinel, carbon, graphite, molybdenum, tungsten, platinum, or the like which is inactive at the firing temperature of the shaped body. Alternatively, a method may be used in which a shaped body is stacked on an inactive sheet, the resulting laminated body is formed into a roll, and then firing is performed. Alternatively, a method may be used in which a sheet-like shaped body is formed on an inactive layer, and after firing, the sheet-like shaped body is separated from the inactive layer. Alternatively, a method may be used in which a shaped body is formed on an inactive layer, and after firing, the inactive layer is removed. For example, when graphite is used for the inactive layer, a method may be used in which firing is performed under a non-oxidizing atmosphere (e.g., in nitrogen) to obtain a desired fired shaped body in the presence of the inactive layer, then heat treatment is performed again under an oxidizing atmosphere (e.g. in air) at a temperature lower than that in the previous firing, and thereby graphite is removed by burning. Even when the inorganic particles contained in the shaped body grow into crystal grains with an isotropic and polyhedral shape, it is considered to be possible to grow a specific crystal plane depending on the situation. Since the thickness of the shaped body is 15 μm or less, grain growth in the thickness direction of the shaped body is limited, and grain growth is more promoted in the surface direction of the shaped body. Therefore, a specific crystal plane grows in the surface of the shaped body, and thus the aspect ratio and the degree of orientation are increased. Consequently, the number of crystal grains 12 present in the thickness direction of the shaped body at any one point is substantially one.

In the firing step, the shaped body is fired in a state in which volatilization of a specific component (e.g., alkaline component) contained in the shaped body is suppressed. By suppressing a specific component from being volatilized from the shaped body, it is possible to prevent the composition of the fired plate-like polycrystalline particles from varying. For example, in order to suppress volatilization, the shaped body may be fired in a state in which other inorganic particles coexist with the inorganic particles constituting the shaped body. In such a manner, since a specific component is volatilized from the coexisting other inorganic particles, it is possible to relatively easily suppress the specific component from being volatilized from the shaped body. In this case, the "other inorganic particles" may be in the form of powder or a shaped body. Alternatively, in order to achieve the volatilization-suppressing state, the shaped body may be placed in a covered sheath or the like and fired in a sealed state. Preferably, the space in the sheath is decreased as much as possible. If the atmosphere in the sheath is excessively concentrated, for example, if the amount of the other inorganic particles allowed to coexist in the sheath is increased excessively, sintering of the shaped body and grain growth may be activated, resulting in occurrence of waviness in the shaped body, or grain growth may proceed so as to decrease the surface area of the grain, namely, the thickness may increase, resulting in a decrease in the aspect ratio of the crystal grains. Therefore, it is important to empirically set the inner volume of the sheath, the amount of the shaped body, the amount of the inorganic particles allowed to coexist, and the like to be appropriate so that the atmosphere in the sheath is in a optimum state. When firing is performed in the presence of the other inorganic particles, preferably, the coexisting inorganic particles have the same composition as those of the shaped body. It may also be possible to allow particles in which a specific component is more easily volatilized than the inorganic particles constituting the shaped body to coexist so that the specific component can be supplemented to the fired shaped body. Furthermore, it is more important to provide an optimum atmosphere at an optimum timing in the firing step. For example, a method may be used in which firing is performed at a first firing temperature in a sheath controlled to be a first atmosphere, the temperature is decreased to room temperature, and then firing is performed at a second firing temperature higher than the first firing temperature in a sheath controlled to be a second atmosphere. The firing atmosphere may be air. Alternatively, in view of suppression of volatilization of the constituent elements, reactivity with the inactive layer, and the like, the atmosphere may be an oxygen atmosphere; a neutral atmosphere, such as nitrogen; a reducing atmosphere in the presence of hydrogen or a hydrocarbon; or a vacuum. Furthermore, from the standpoint of accelerating in-plane grain growth, firing under pressure, such as hot pressing, may be performed.

Figure 2:
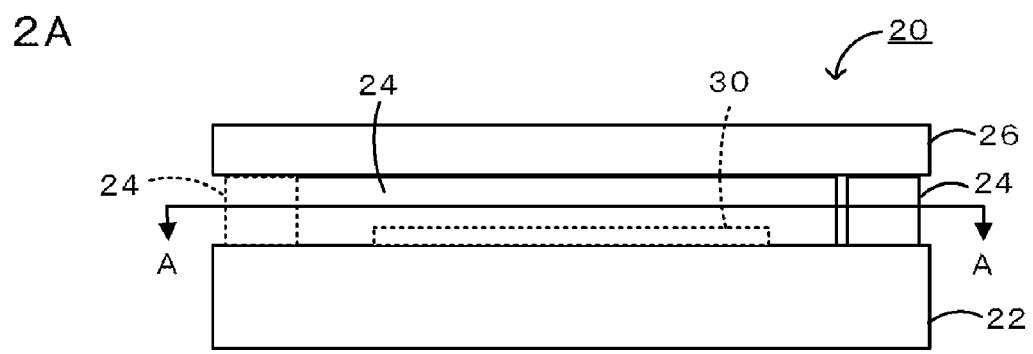
FIG. 2A is a side view which schematically shows a firing apparatus 20.
FIG. 2B is a cross-sectional view taken along the line A-A of FIG. 2A.
Figure 2:
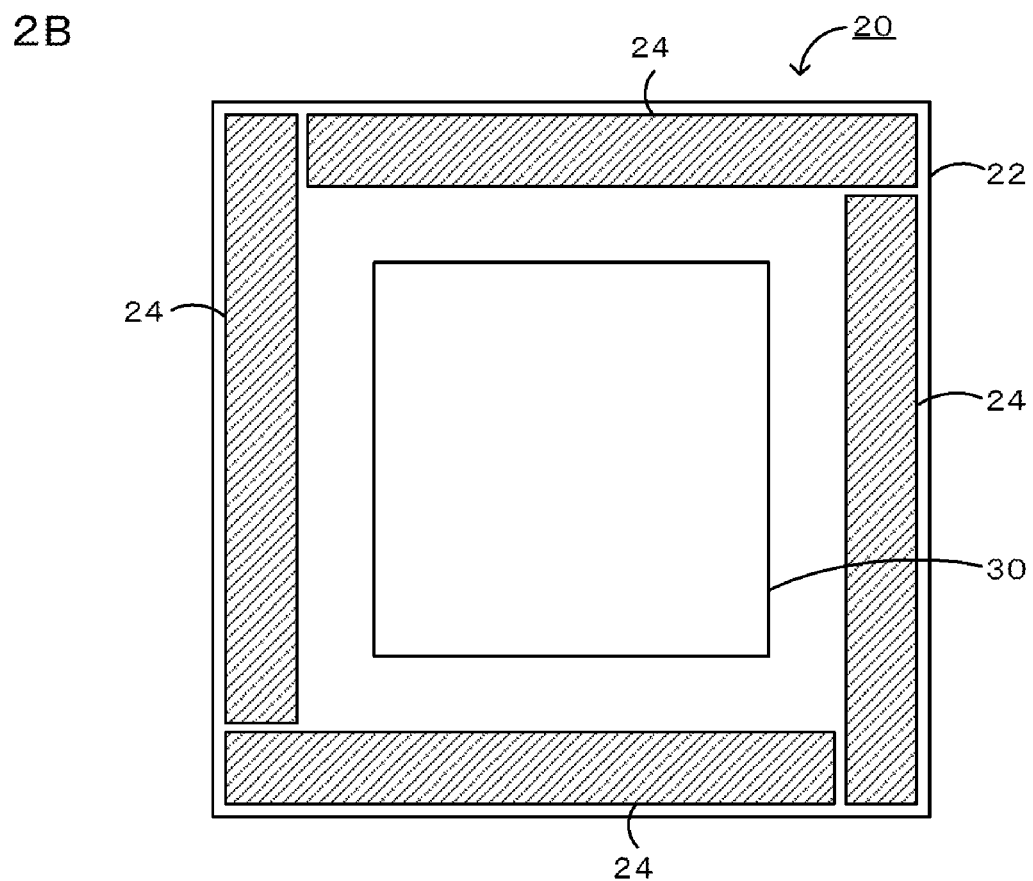

The firing step will be described with reference to the drawings. FIG. 2A is a side view which schematically shows a firing apparatus 20, and FIG. 2B is a cross-sectional view taken along the line A-A of FIG. 2A. The firing apparatus 20 is used when a shaped body 30 is fired in a firing furnace which is not shown. The firing apparatus 20 includes a setter 22 on which a green shaped body 30 is placed and which is a fired ceramic plate, coexisting green shaped body 24 which are composed of the same inorganic particles as those of the shaped body 30 and have thickness larger than that of the shaped body 30, and a quadrangular plate 26 which is placed on the coexisting green shaped body 24 and which is a fired ceramic plate serving as a cover for the shaped body 30. As shown in FIG. 1B, by surrounding four sides of the shaped body 30 with the coexisting green shaped body 24, it is possible to prevent volatilization of a specific component (e.g., alkaline component) from the shaped body 30 and a change in the composition. In this example, the setter 22 is planar. It is also possible to use a setter in which the contact area with the shaped body 30 is decreased so as to prevent adhesion between the setter and the shaped body 30. Examples of such a setter include a setter in which the sheet-placing surface is roughened, a honeycomb-shaped setter in which a plurality of through-holes are formed in the sheet-placing surface, and a dimpled setter. Furthermore, a method may be used in which alumina powder or zirconia powder that is stable at the firing temperature of the shaped body 30 is spread over the sheet-placing surface of the setter 22, the shaped body 30 is placed thereon, and then firing is performed. When inorganic particles in the form of powder are allowed to coexist inside the sheath instead of allowing a green shaped body to coexist, by adjusting the manner of placing the setter, the size of the setter, the stacking method, the position of placement of the powder inside the sheath, and the like, it is possible to homogeneously control the atmosphere in the sheath. Thus, when pluralities of shaped body are fired, the individual shaped body can have a homogeneous crystal grain structure.

With respect to the firing conditions, preferably, the shaped body 30 is fired at a temperature that is higher, by 10 percent or more, than the firing temperature at which equilibrium-shaped crystals are obtained by firing, for example, at the firing temperature at which densification and grain growth are caused by firing a bulk. At the temperature higher by 10 percent or more, grain growth of the shaped body 30 with a thickness of 15 µm or less can be promoted sufficiently. Preferably, firing is performed at a high temperature to such an extent that the material of the shaped body is not decomposed. In particular, when the thickness of the sheet is decreased, grain growth does not easily proceed, and therefore, it is preferable to increase the firing temperature. Further, in order to increase the size of the crystal grains 12, preferably, it is preferable to increase the firing temperature. For example, in the firing step of inorganic particles composed of $NaNbO_3$ in which Li, K, or the like is substituted to the A site and Ta is added to the B site (($Li_xNa_yK_z$)$Nb_MTa_NO_3$), the firing temperature of the shaped body is preferably set at 900° C. to 1,250° C. At a firing temperature of 900° C. or higher, crystal growth of the particles is promoted, which is preferable. At a temperature of 1,250° C. or less, volatilization of an alkaline component or the like can be reduced, and decomposition of the material can be suppressed. By firing in such a manner, the inorganic particles contained in the shaped body 30 grow into anisotropic crystal grains.

(4) Pulverizing Step of Fired Shaped Body Using Mesh

Figure 3:
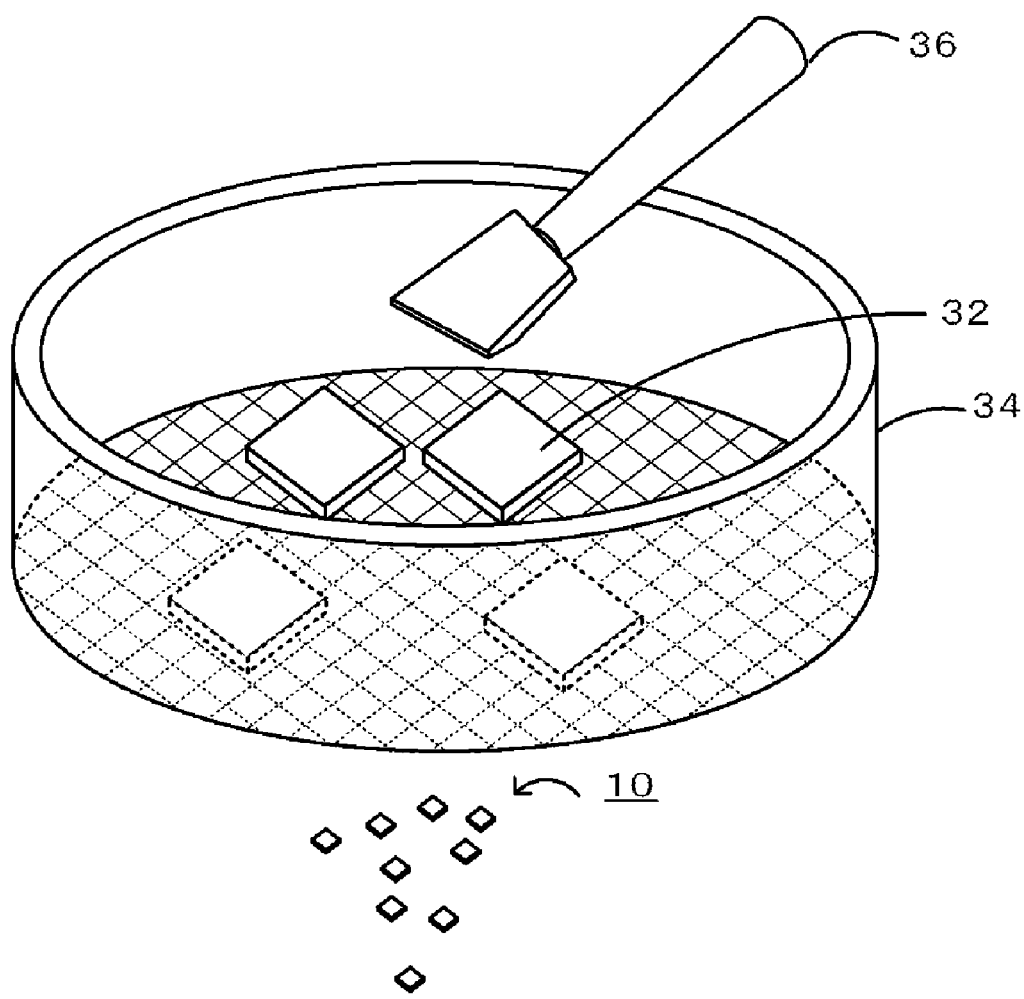
FIG. 3 is a schematic diagram showing an example of a pulverization step using a mesh.

Subsequently, the fired shaped body is crushed and classified. Here, a mesh (sieve) having openings with a size corresponding to a desired particle size is used. Preferably, a mesh with openings of 1.0 mm or less is used. FIG. 3 is a schematic diagram showing an example of a pulverization step using a mesh. In the pulverization step using the mesh, for example, a mesh with an opening diameter of 45 µm, 25 µm, 20 µm, or the like can be used. A fired shaped body 32 obtained by firing the shaped body 30 is relatively easily crushed. Therefore, after the fired shaped body 32 is placed on a mesh 34, by moving the mesh 34 while lightly pressing the fired shaped body 32 with a pressing member 36, such as a spatula, it is possible to carry out the pulverizing step using the mesh. In such a manner, crushing of the fired shaped body 32 and classification of the crushed plate-like polycrystalline particles 10 (refer to FIG. 1) can be performed simultaneously. In order to obtain plate-like polycrystalline particles 10 having a larger particle diameter and a larger aspect ratio, the size of the openings of the mesh is increased. In order to obtain plate-like polycrystalline particles 10 having a smaller particle diameter and a smaller aspect ratio, the size of the openings of the mesh is decreased. By a simple process of changing the size of the openings of the mesh, the properties of the plate-like polycrystalline particles 10 can be changed. In such a manner, the plate-like polycrystalline particles 10 shown in FIGS. 1A to 1C can be obtained.

Figure 4:
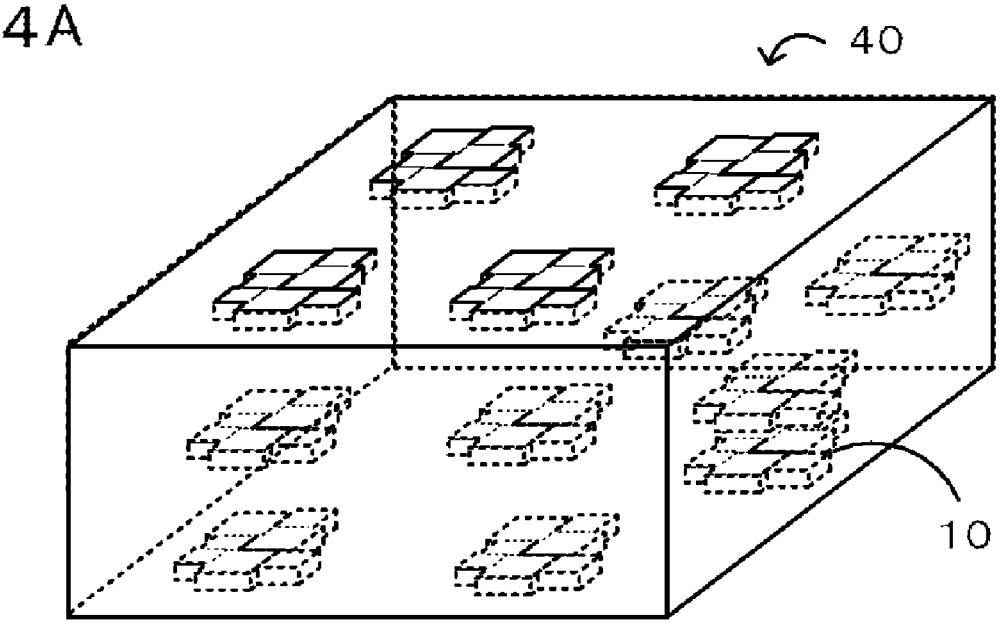
FIGS. 4A and 4B are schematic diagrams showing an example of a method for producing a crystallographically-oriented ceramic 50.
Figure 4:
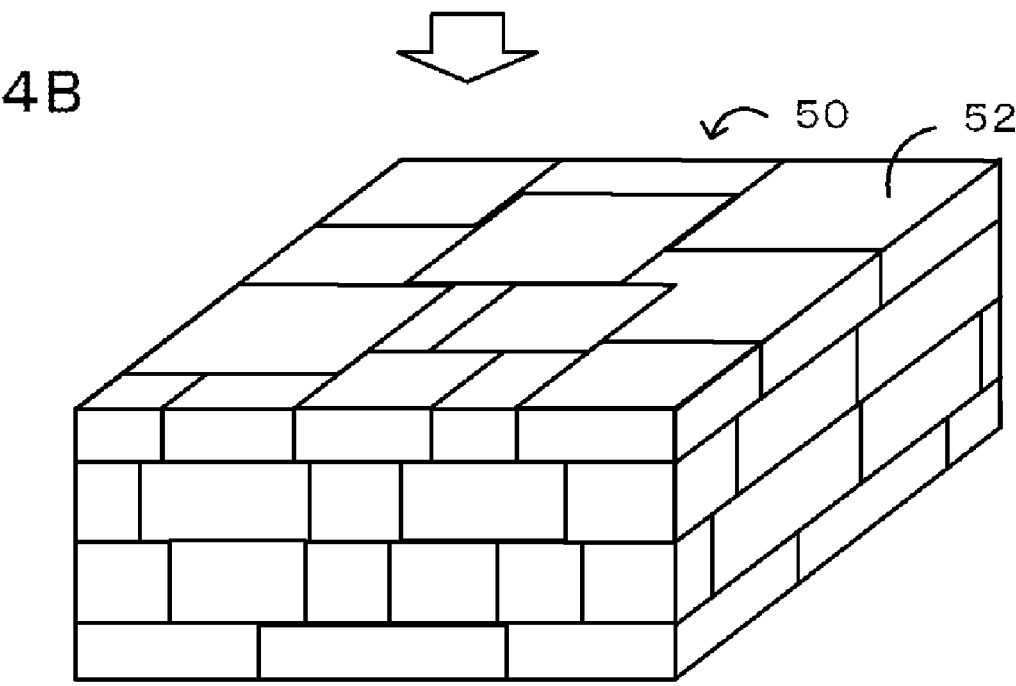

The resulting plate-like polycrystalline particles 10 may be used as a raw material for a crystallographically-oriented ceramic. A method for producing a crystallographically-oriented ceramic using the plate-like polycrystalline particles 10 as a raw material will be described below. The crystallographically-oriented ceramic may be formed into an arbitrary shape, for example, with a thickness exceeding 15 µm. That is, the plate-like polycrystalline particles 10 may be produced as an intermediate product for forming a crystallographically-oriented ceramic. FIGS. 4A and 4B are schematic diagrams showing an example of a method for producing a crystallographically-oriented ceramic, FIG. 4A showing a state after orientation and before firing, FIG. 4B showing a crystallographically-oriented ceramic 50 obtained after firing. A crystallographically-oriented ceramic may be produced by a method including a mixing step of the plate-like polycrystalline particles 10, other raw material powder (e.g., non-oriented inorganic particles), and as necessary, a binder, a plasticizer, or the like; and a second shaping step of forming the mixture into a secondary shaped body 40 (FIG. 4A) with a predetermined shape by orientation-shaping (secondary orientation) in which the plate-like polycrystalline particles 10 are oriented in a predetermined direction. The orientation-shaping can be performed by the doctor-blade method, extrusion molding, or the like described above. Then, a second firing step is carried out in which the secondary shaped body is fired such that the other raw material powder is oriented in the direction in which the plate-like polycrystalline particles 10 are oriented. Thereby, a crystallographically-oriented ceramic 50 is obtained (FIG. 4B). The firing temperature in the second firing step may be equal to or higher, by 10 percent or more, than the firing temperature at which crystals with the growth form under predetermined firing conditions described above are obtained. When firing is performed after the plate-like polycrystalline particles 10 are oriented in one direction as described above, in the other raw material powder, grain growth proceeds following the crystallographic orientation of the plate-like polycrystalline particles 10, or in the oriented plate-like polycrystalline particles 10, grain growth proceeds while taking in the other raw material powder. Consequently, it is possible to obtain a crystallographically-oriented ceramic 50 including many oriented crystals 52 which are oriented in one direction. Even when the shaped body 30 is fired not in a volatilization-suppressing state, the intended compositional ratio of the crystallographically-oriented ceramic 50 can be achieved by adding the volatilized component in the mixing step or the second shaping step.

In method for producing the plate-like polycrystalline particles 10 according to the embodiment described above, inorganic particles are formed into a self-supported, sheet-like shaped body with a thickness of 15 μm or less, the shaped body is fired, and the fired shaped body is passed through openings with a predetermined size to perform crushing and classification. Thus, it is possible to increase the aspect ratio and the degree of orientation of crystals by simpler processing. The plate-like polycrystalline particle 10 has a structure in which crystal grains 12 are bonded together at grain boundaries 14, and crushing can be easily performed at the grain boundaries 14. Therefore, the particle diameter and the aspect ratio can be easily adjusted. Consequently, compared with a case where a crystallographically-oriented ceramic is produced using single crystal particles, the degree of orientation of the crystallographically-oriented ceramic 50 and the size of the oriented crystals 52 can be adjusted by easy processing. Furthermore, since it is not necessary to use an additive for increasing the orientation, it is possible to obtain plate-like polycrystalline particles having a more homogeneous composition. Consequently, when the plate-like polycrystalline particles 10 are used for producing the crystallographically-oriented ceramic 50, it is possible to obtain a crystallographically-oriented ceramic 50 having a homogeneous composition and high orientation.

It is to be understood that the present invention is not limited to the embodiment described above, and various embodiments within the scope of the technical field of the present invention can be carried out.

For example, in the embodiment described above, the plate-like polycrystalline particles 10 are used as a raw material for a crystallographically-oriented ceramic 50. The plate-like polycrystalline particles 10 may be used in other applications (such as for fillers). For example, the plate-like polycrystalline particles 10 of the present invention can be used for polycrystalline materials composed of a substance, the function or properties of which have crystallographic orientation dependence, such as dielectric materials, pyroelectric materials, piezoelectric materials, ferroelectric materials, magnetic materials, ion-conducting materials, electron-conducting materials, heat-conducting materials, thermoelectric materials, superconducting materials, and abrasion-resistant materials. Specifically, high-performance elements can be obtained by applying the plate-like polycrystalline particles in various sensors, such as acceleration sensors, pyroelectric sensors, ultrasonic sensors, electric field sensors, temperature sensors, gas sensors, knocking sensors, yaw rate sensors, air bag sensors, and piezoelectric gyro sensors; energy transducers, such as piezoelectric transformers; low-loss actuators or low-loss resonators, such as piezoelectric actuators, ultrasonic motors, and resonators; and other elements, such as capacitors, bimorph piezoelectric elements, vibration pickups, piezoelectric microphones, piezoelectric ignition elements, sonars, piezoelectric buzzers, piezoelectric speakers, oscillators, filters, dielectric elements, microwave dielectric elements, thermoelectric conversion elements, pyroelectric elements, magnetoresistive elements, magnetic elements, superconducting elements, resistance elements, electron-conducting elements, ion-conducting elements, PTC elements, and NTC elements. In such cases, the aspect ratio of the crystal grains 12 and the aspect ratio of the plate-like polycrystalline particles 10 are appropriately set depending on the application. The aspect ratio and the particle size of the plate-like polycrystalline particles 10 can be easily changed simply by setting the diameter of the openings in the pulverizing step using the mesh.

In the embodiments described above, in the plate-like polycrystalline particles 10, the specific crystal planes 11 are present on the sheet surface and aligned (refer to FIGS. 1A to 1C). However, as long as the crystal grains 12 are two-dimensionally bonded together at the grain boundaries, the crystal planes 11 may not be present on the sheet surface.

EXAMPLES

Experimental examples in which plate-like polycrystalline particles 10 are specifically produced will be described below.

Experimental Example 1

Synthesis Step of Inorganic Particles

Powders ($Li_2CO_3$, $Na_2CO_3$, $K_2CO_3$, $Nb_2O_5$, and $Ta_2O_5$) were weighed so as to satisfy the composition $Li_{0.07}(Na_{0.5}K_{0.5})_{0.93}Nb_{0.9}Ta_{0.1}O_3$. The weighed powders, zirconia balls, and ethanol as a dispersion medium were placed in a plastic pot, and wet mixing and pulverization were performed using a ball mill for 16 hours. The resulting slurry was dried using an evaporator and a dryer, and then calcination was performed at 850° C. for 5 hours. The calcined powder, zirconia balls, and ethanol as a dispersion medium were subjected to wet pulverization using a ball mill for 5 hours, followed by drying using an evaporator and a dryer. Thereby, powder of inorganic particles composed of $Li_{0.07}(Na_{0.5}K_{0.5})_{0.93}Nb_{0.9}Ta_{0.1}O_3$ was obtained. The average particle diameter of the resulting powder was measured with a laser diffraction/scattering particle size distribution analyzer LA-750 manufactured by HORIBA, Ltd. using water as a dispersion medium. As a result, the median diameter (D50) was 0.6 μm.

(Shaping Step of Forming Self-Supported, Sheet-Like Shaped Body)

The powder of inorganic particles, polyvinyl butyral (BM-2, manufactured by Sekisui Chemical Co., Ltd.) as a binder, a plasticizer (DOP, manufactured by Kurogane Kasei Co., Ltd.), and a dispersant (SP-O30, manufactured by Kao Corporation) were mixed into a dispersion medium obtained by mixing equal amounts of toluene and isopropanol to prepare a shaping material in the form of a slurry. The amounts of the individual materials used were 100 parts by weight of the dispersion medium, 10 parts by weight of the binder, 4 parts by weight of the plasticizer, and 2 parts by weight of the dispersant on the basis of 100 parts by weight of the inorganic particles. The resulting slurry was defoamed by stirring under reduced pressure so that the viscosity was adjusted to 500 to 700 cP. The viscosity of the slurry was measured using an LVT viscometer manufactured by Brookfield. The resulting slurry was formed into a sheet on a PET film by a doctor-blade method. The thickness after drying was set at 5 μm.

(Firing Step of Shaped Body)

The sheet-like shaped body peeled off from the PET film was cut into a 50-mm square with a cutter and placed in the center of a setter made of zirconia (size: 70 mm square, height: 5 mm). Green shaped sheets (size: 5 mm×40 mm, thickness: 100 μm) composed of the same shaping raw materials as those for the sheet-like shaped body were placed on the setter outside the four sides of the sheet-like shaped body so as to surround the shaped body, and a quadrangular plate made of zirconia (size: 70 mm square, height: 5 mm) was further placed thereon. In such a manner, the space around the sheet-like shaped body was minimized, and the same shaping raw materials as those for the sheet-like shaped body were allowed to coexist for firing. Subsequently, degreasing was performed at 600° C. for 2 hours, and then firing was performed at 1,100° C. for 5 hours. After firing, a portion not adhering to the setter was retrieved.

(Pulverizing Step of Fired Shaped Body Using Mesh)

The fired shaped body was placed on a 300-mesh sieve (opening diameter: 45 μm), and crushing and classifying were performed while lightly pressing the fired shaped body with a spatula. Thereby, plate-like polycrystalline particles of Experimental Example 1 were obtained.

Experimental Examples 2 and 3

Plate-like polycrystalline particles of Experimental Examples 2 and 3 were produced as in Experimental Example 1 except that a 500-mesh sieve (opening diameter: 25 μm) and a 635-mesh sieve (opening diameter: 20 μm) were used, respectively.

Experimental Examples 4 to 7

Plate-like polycrystalline particles of Experimental Examples 4 to 7 were produced as in Experimental Example 1 except that the thickness of the sheet-like shaped body was set at 2 μm, 10 μm, 15 μm, and 20 μm, respectively.

Experimental Examples 8 to 12

In the synthesis step, powders of inorganic particles were prepared such that the compositions of the inorganic particles were $Li_{0.07}(Na_{0.5}K_{0.5})_{0.93}NbO_3$, $Li_{0.07}(Na_{0.5}K_{0.5})_{0.97}NbO_{3.02}$, $Li_{0.07}(Na_{0.5}K_{0.5})_{1.03}NbO_{3.05}$, $Li_{0.1}(Na_{0.5}K_{0.5})_{1.1}NbO_{3.1}$, and $Li_{0.07}(Na_{0.5}K_{0.5})_{0.91}NbO_{2.99}$. That is, powders of inorganic particles were prepared such that, in general formula $ABO_3$, the A/B was 1.00, 1.04, 1.10, 1.20, and 0.98. Other than the above, the process was conducted in the same manner as in Experimental Example 2. As a result, plate-like polycrystalline particles of Experimental Examples 8 to 12 were obtained. The average particle diameter in these experimental examples was measured by the same method as that described above. As a result, the median diameter (D50) was 0.6 μm.

Experimental Example 13

Powders ($Bi_2O_3$, $Na_2CO_3$, $K_2CO_3$, $Ag_2O$, and $TiO_2$) were weighed so as to satisfy the composition $(Bi_{0.5}Na_{0.35}K_{0.1}Ag_{0.05})TiO_3$, and wet mixing, pulverization, and drying were performed as in Experimental Example 1. Then, calcination was performed at 900° C. for 2 hours. The calcined powder was pulverized and dried as in Experimental Example 1. Thereby, powder of inorganic particles composed of $(Bi_{0.5}Na_{0.35}K_{0.1}Ag_{0.05})TiO_3$ was obtained. The resulting powder was formed into a plate-like polycrystalline particle of Experimental Example 13 as in Experimental Example 2 except that, in the shaping step, the thickness of the shaped body was set at 5 μm, and in the firing step, degreasing was performed at 600° C. for 2 hours and the firing temperature was set at 1,250° C. for 3 hours. The average particle diameter in the experimental example was measured by the same method as that described above. As a result, the median diameter (D50) was 0.6 μm.

Experimental Example 14

In the synthesis step, a $ZnO$—$B_2O_3$—$SiO_2$-based glass powder (ASF1891 manufactured by Asahi Glass (AGG)) (1% by weight) was added to a synthesized powder having the composition $0.2Pb(Mg_{0.33}Nb_{0.67})O_3$-$0.35PbTiO_3$-$0.45PbZrO_3$ to which 1% by weight of NiO was added. The weighed mixture, zirconia balls, and ion-exchanged water as a dispersion medium were placed in a plastic pot, and wet mixing was performed using a ball mill for 16 hours. The resulting slurry was dried using a dryer, and then calcination was performed at 800° C. for 2 hours. The calcined powder, zirconia balls, and ion-exchanged water as a dispersion medium were subjected to wet pulverization using a ball mill, followed by drying using a dryer. Thereby, powder of inorganic particles was obtained. The powder was formed into a sheet with a thickness of 1 μm in the shaping step. The resulting sheet was placed on a quadrangular zirconia plate disposed in an alumina sheath. As powder for controlling the firing atmosphere, a small amount of powder of inorganic particles composed of $0.2Pb(Mg_{0.33}Nb_{0.67})O_3$-$0.35PbTiO_3$-$0.45PbZrO_3$ was allowed to coexist in the sheath. The same process was carried out as in Experimental Example 1 except that degreasing was performed at 600° C. for 2 hours and firing was performed at 1,100° C. for 5 hours in the firing step. Thereby, a plate-like polycrystalline particle of Experimental Example 14 was obtained. The average particle diameter in the experimental example was measured by the same method as that described above. As a result, the median diameter (D50) was 0.6 μm.

Experimental Example 15

A plate-like polycrystalline particle of Experimental Example 15 was formed as in Experimental Example 14 except that in the synthesis step, powder of inorganic particles with the composition $0.2Pb(Mg_{0.3}3Nb_{0.67})O_3$-$0.35PbTiO_3$-$0.45PbZrO_3$ was used, NiO and glass powder were not added, and in the shaping step, shaping was performed with a sheet thickness of 2 μm. The average particle diameter in the experimental example was measured by the same method as that described above. As a result, the median diameter (D50) was 0.6 μm.

Experimental Example 16

A plate-like polycrystalline particle of Experimental Example 16 was formed as in Experimental Example 14 except that the A/B was 1.1 in $0.2Pb(Mg_{0.33}Nb_{0.67})O_3$-$0.35PbTiO_3$-$0.45PbZrO_3$.

[Electron Microscopy]

With respect to the plate-like polycrystalline particles of Experimental Examples 1 to 14, SEM photographs were taken using a scanning electron microscope (JSM-6390 manufactured by JEOL Ltd.). First, the plate-like polycrystalline particles were placed randomly on a conductive tape using a spoon, and in such a state, SEM observation was performed. From the observed particles, particles in which the sheet surface was parallel to the observation direction, i.e., particles standing vertically, were selected, and the thickness Z of crystal grains 12 was determined. Then, 0.1 g of plate-like polycrystalline particles was added to 2 g of ethanol, and the mixture was dispersed for 30 minutes using an ultrasonic dispersing device (ultrasonic washing machine). The dispersion liquid was spin-coated on a glass substrate at 2,000 rpm such that the plate-like polycrystalline particles were prevented from overlapping each other as much as possible and that the crystal planes were parallel to the surface of the substrate, and then SEM observation was performed. In a field of view which included about 20 to 40 crystal grains, the crystal planes of the plate-like polycrystalline particles were observed. The longest length X of the crystal plane 11 of each crystal grain 12 was determined. Assuming that the longest length X was a grain diameter of the crystal gain 12, the grain diameter was divided by the thickness Z of the crystal grain 12 to calculate the aspect ratio for each crystal grain 12. The average value of the individual crystal grains 12 was considered as the aspect ratio of the crystal grains 12 contained in the plate-like polycrystalline particle 10. Similarly, from the SEM photograph, the thickness W of the plate-like polycrystalline particles 10 was determined. In a field of view which included about 5 to 30 plate-like polycrystalline particles 10, the crystal planes of the plate-like polycrystalline particles 10 were observed. The longest length Y of each plate-like polycrystalline particle 10 was determined. Assuming that the longest length Y was a particle diameter of each plate-like polycrystalline particle 10, the particle diameter was divided by the thickness W of the plate-like polycrystalline particle 10 to calculate the aspect ratio for each plate-like polycrystalline particle 10. The average value of the individual plate-like polycrystalline particles 10 was considered as the aspect ratio of the plate-like polycrystalline particles 10.

[Orientation]

With respect to each of the plate-like polycrystalline particles of Experimental Examples 1 to 14, an XRD pattern was measured when the surface of the plate-like polycrystalline particles was irradiated with X-ray using an XRD diffraction device (RAD-IB manufactured by Rigaku Corporation). The degree of orientation of the pseudocubic (100) plane was measured by the Lotgering method in which the degree of orientation was calculated according to the equation (1) described above using peaks of pseudocubic (100), (110), and (111) planes. In order to perform XRD diffraction measurement, 0.1 g of plate-like polycrystalline particles was added to 2 g of ethanol, the mixture was dispersed for 30 minutes using an ultrasonic dispersing device (ultrasonic washing machine), and the dispersion liquid was spin-coated on a glass substrate with a size of 25 mm×50 mm at 2,000 rpm such that the plate-like polycrystalline particles were prevented from overlapping each other as much as possible and that the crystal planes were parallel to the surface of the substrate. In such a state, the XRD diffraction Pattern was measured.

Figure 5:
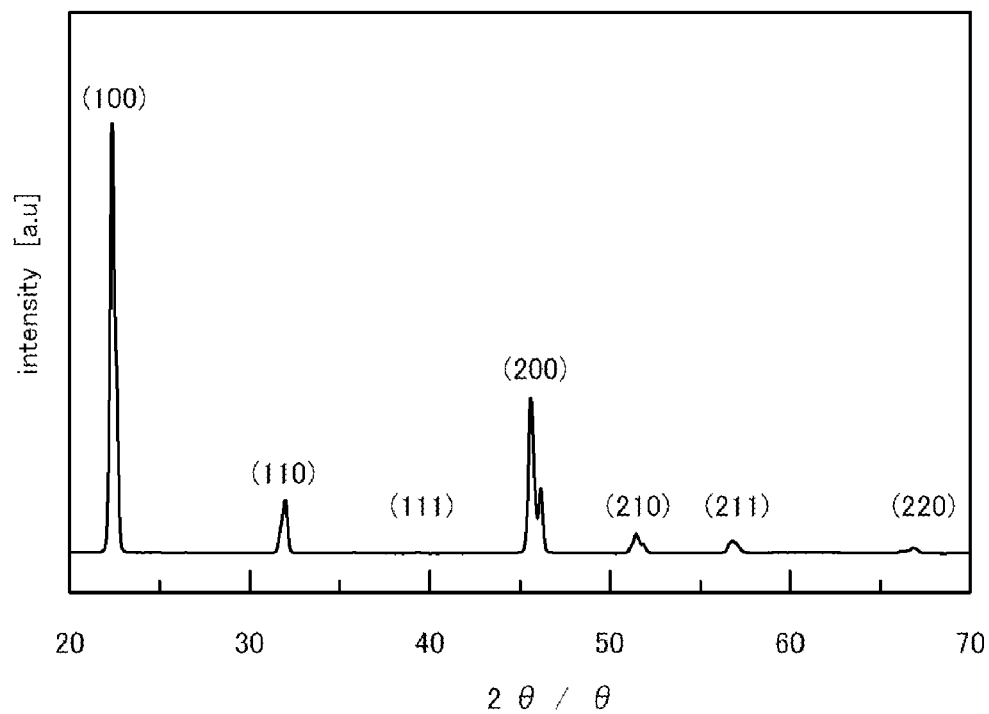
FIG. 5 shows an X-ray diffraction pattern in Experimental Example 4.
Figure 6:
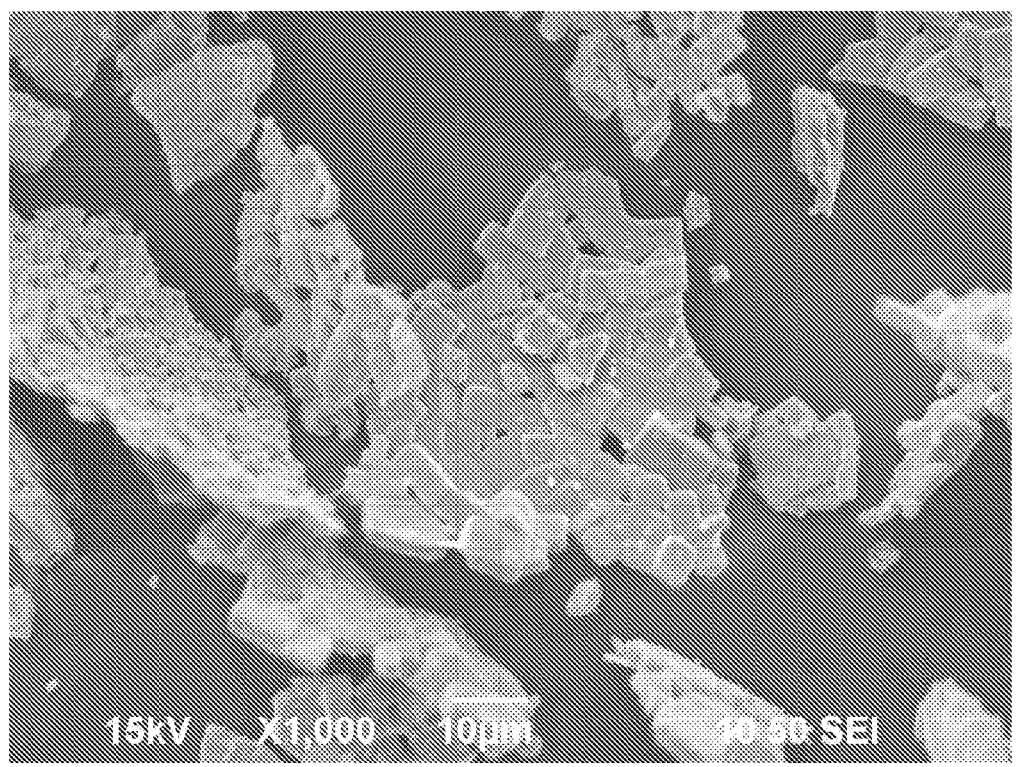
FIG. 6 is a SEM photograph in Experimental Example 1.
Figure 7:
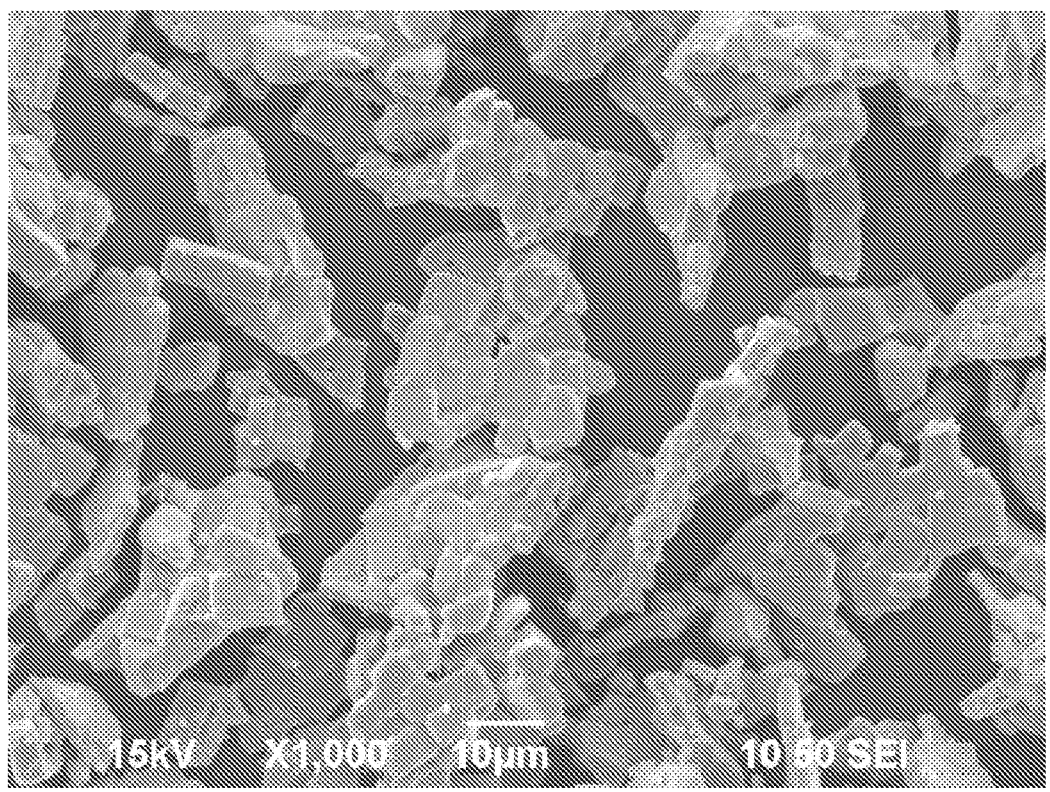
FIG. 7 is a SEM photograph in Experimental Example 2.
Figure 8:
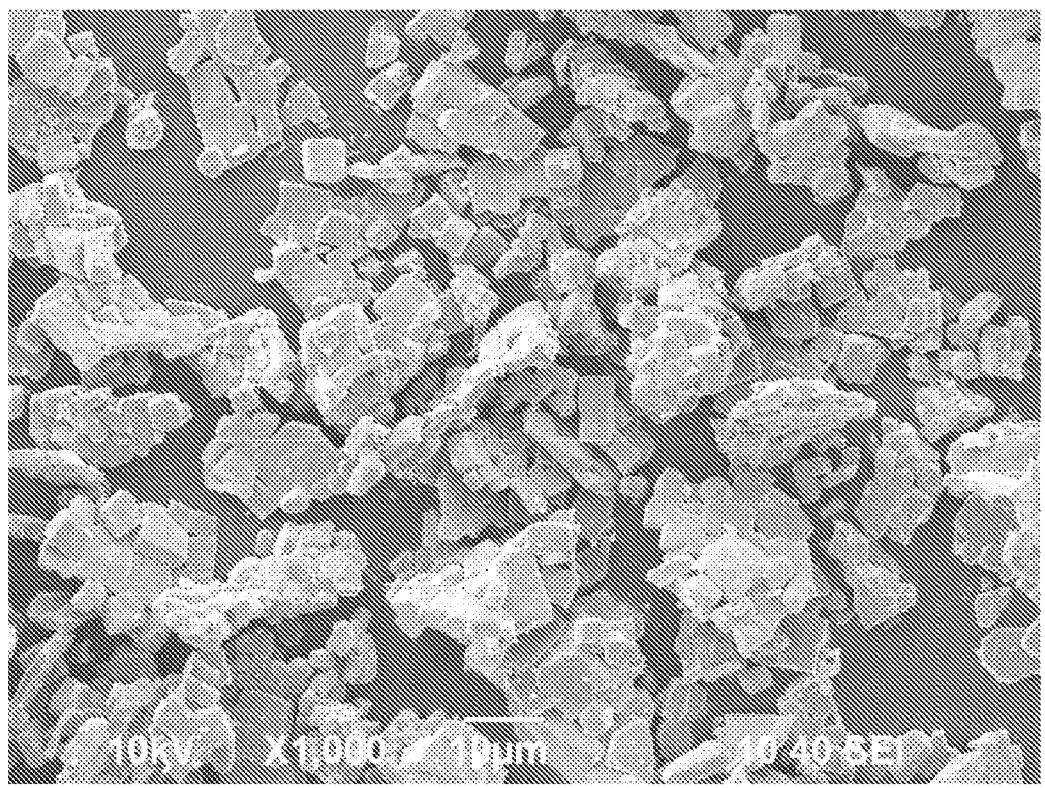
FIG. 8 is a SEM photograph in Experimental Example 3.

The evaluation results of Experimental Examples 1 to 16 are shown in Table 1 and FIGS. 5 to 8. Table 1 shows the name of sample, inorganic material, firing temperature, thickness of the plate-like polycrystalline particle 10, mesh opening diameter, aspect ratio of the crystal grain 12, range of the size of the crystal grain 12, aspect ratio of the plate-like polycrystalline particle 10, range of the size of the plate-like polycrystalline particle 10, and degree of orientation of the plate-like polycrystalline particle 10. FIG. 5 shows an X-ray diffraction pattern in Experimental Example 2, and FIGS. 6 to 8 are SEM photographs in Experimental Examples 1 to 3, respectively. The SEM photographs show plate-like polycrystalline particles randomly placed on a glass substrate. According to the evaluation results, as is evident from FIG. 5, since the peak due to the (100) plane is large, the plate-like polycrystalline particles 10 of the present invention are composed of a plurality of crystal grains having the (100) plane as the sheet plane. As shown in FIGS. 6 to 8, the plate-like polycrystalline particles include a plurality of crystal grains each having a specific crystal plane, the number of crystal grains present in the thickness direction at any one point is one in a large region, and the plurality of crystal grains are bonded together at grain boundaries with specific crystal planes being aligned. Consequently, it is clear that the plate-like polycrystalline particles can be relatively easily crushed at grain boundaries where the crystal grains are bonded together. That is, according to Experimental Examples 1 to 3, it is possible to easily change the aspect ratio and the size of the plate-like polycrystalline particles by changing the mesh opening diameter. Furthermore, as is evident from Table 1, it is possible to change the degree of orientation and the aspect ratio of the crystal grains 12 by changing the thickness and the A/B of the plate-like polycrystalline particles. According to Experimental Examples 2, 8 to 12, 14, and 16, the A/B in the range of 1.0 to 1.2 is more preferred. As is evident from Table 1, according to the results of Experimental Examples 1 and 4 to 6, at a thickness of the plate-like polycrystalline particle of 15 μm or less, the degree of orientation is improved. Additionally, in Experimental Examples 7 and 12, the number of crystal grains present in the thickness direction was not substantially one.

TABLE 1

| Sample | Inorganic particles | Firing temperature (° C.) | Thickness (μm) | Mesh opening diameter (μm) | Aspect ratio of crystal grain | Size of crystal grain (μm) | Aspect ratio of polycrystalline particle | Size of polycrystalline particle (μm) | Degree of orientation[1] |
|---|---|---|---|---|---|---|---|---|---|
| Example 1 | Niobate[2] | 1100 | 5.0 | 45 | 3.5 | 1~15 | 11.3 | 10~45 | 60 |
| Example 2 | Niobate | 1100 | 5.0 | 25 | 3.5 | 1~15 | 5.8 | 10~25 | 60 |
| Example 3 | Niobate | 1100 | 5.0 | 20 | 3.5 | 1~15 | 4.2 | 5~20 | 60 |
| Example 4 | Niobate | 1100 | 2.0 | 45 | 4.1 | 1~8 | 23.4 | 10~45 | 85 |
| Example 5 | Niobate | 1100 | 10.0 | 45 | 2.2 | 1~20 | 4.1 | 10~45 | 35 |
| Example 6 | Niobate | 1100 | 15.0 | 45 | 1.6 | 1~20 | 3.1 | 10~45 | 25 |
| Example 7 | Niobate | 1100 | 20.0 | 45 | 1.1 | 1~22 | 2.2 | 10~45 | 5 |
| Example 8 | Niobate[3] | 1100 | 5.0 | 25 | 3.9 | 1~16 | 5.4 | 10~25 | 70 |
| Example 9 | Niobate[4] | 1100 | 5.0 | 25 | 4.5 | 1~25 | 4.9 | 10~25 | 75 |
| Example 10 | Niobate[5] | 1100 | 5.0 | 25 | 3.5 | 1~20 | 5.7 | 10~25 | 70 |
| Example 11 | Niobate[6] | 1100 | 5.0 | 25 | 3.0 | 1~12 | 5.3 | 10~25 | 65 |
| Example 12 | Niobate[7] | 1100 | 5.0 | 25 | 1.8 | 1~6 | 5.2 | 10~25 | 15 |

TABLE 1-continued

| Sample | Inorganic particles | Firing temperature (° C.) | Thickness (μm) | Mesh opening diameter (μm) | Aspect ratio of crystal grain | Size of crystal grain (μm) | Aspect ratio of polycrystalline particle | Size of polycrystalline particle (μm) | Degree of orientation[1] |
|---|---|---|---|---|---|---|---|---|---|
| Example 13 | Titanate[8] | 1125 | 5.0 | 25 | 3.4 | 1~14 | 5.3 | 10~25 | 60 |
| Example 14 | Lead composite oxide[9] | 1100 | 1.0 | 25 | 3.1 | 1~8 | 22.4 | 10~25 | 70 |
| Example 15 | Lead composite oxide[10] | 1100 | 2.0 | 25 | 2.1 | 1~5 | 10.9 | 10~25 | 30 |
| Example 16 | Lead composite oxide[11] | 1100 | 1.0 | 25 | 3.5 | 1~12 | 20.8 | 10~25 | 75 |

[1] Degree of orientation in (100) plane measured by Lotgering method
[2] $Li_{0.07}(Na_{0.5}K_{0.5})_{0.93}Nb_{0.9}Ta_{0.1}O_3$
[3] $Li_{0.07}(Na_{0.5}K_{0.5})_{0.93}NbO_3$:$ABO_3$, A/B = 1.00
[4] $Li_{0.07}(Na_{0.5}K_{0.5})_{0.97}NbO_{3.02}$:$ABO_3$, A/B = 1.04
[5] $Li_{0.07}(Na_{0.5}K_{0.5})_{1.03}NbO_{3.05}$:$ABO_3$, A/B = 1.10
[6] $Li_{0.1}(Na_{0.5}K_{0.5})_{1.1}NbO_{3.1}$:ABHOR, A/B = 1.20
[7] $Li_{0.07}(Na_{0.5}K_{0.5})_{0.91}NbO_{2.99}$:$ABO_3$, A/B = 0.98
[8] $(Bi_{0.5}Na_{0.35}K_{0.1}Ag_{0.05})TiO_3$
[9] $0.2Pb(Mg_{0.33}Nb_{0.67})O_3$—$0.35PbTiO_3$—$0.45PbZrO_3$ + NiO + ZnO—$B_2O_3$—$SiO_2$
[10] $0.2Pb(Mg_{0.33}Nb_{0.67})O_3$—$0.35PbTiO_3$—$0.45PbZrO_3$
[11] $0.2Pb(Mg_{0.33}Nb_{0.67})O_3$—$0.35PbTiO_3$—$0.45PbZrO_3$ of Example 14, A/B = 1.1

[Production of Crystallographically-Oriented Ceramic]

The powder of inorganic particles after calcination in Experimental Example 1 (non-oriented raw material powder), the plate-like polycrystalline particles 10 of Experimental Example 1, polyvinyl butyral (BM-2, manufactured by Sekisui Chemical Co., Ltd.) as a binder, a plasticizer (DOP, manufactured by Kurogane Kasei Co., Ltd.), and a dispersant (SP-O30, manufactured by Kao Corporation) were mixed into a dispersion medium obtained by mixing equal amounts of toluene and isopropanol to prepare a shaping material in the form of a slurry such that the composition of the resulting fired crystallographically-oriented ceramic was $Li_{0.03}Na_{0.475}K_{0.475}Nb_{0.82}Ta_{0.18}O_3$. The amounts of the individual materials used were 30 parts by weight of the plate-like polycrystalline particles, 100 parts by weight of the dispersion medium, 10 parts by weight of the binder, 4 parts by weight of the plasticizer, and 2 parts by weight of the dispersant on the basis of 100 parts by weight of the inorganic particles. The resulting slurry was defoamed by stirring under reduced pressure so that the viscosity was adjusted to 2,500 to 3,000 cP. The viscosity of the slurry was measured using an LVT viscometer manufactured by Brookfield. The resulting slurry was formed into a planar shape by a doctor-blade method such that plate-like polycrystalline particles 10 were oriented in one direction and the thickness after drying was 100 μm. The resulting plate was dried at room temperature. Subsequently, degreasing was performed at 600° C. for 2 hours, and then firing was performed at 1,100° C. for 5 hours so that the grain growth of the powder of inorganic particles proceeded. Thereby, a crystallographically-oriented ceramic 50 was obtained.

The present application claims the benefit of the priority from Japanese Patent Application No. 2007-045340 filed on Feb. 26, 2007, Japanese Patent Application No. 2007-185036 filed on Jul. 13, 2007, Japanese Patent Application No. 2007-283185 filed on Oct. 31, 2007, the entire contents except claims of which are incorporated herein by reference.

What is claimed is:

1. A plate-like polycrystalline particle, which is a polycrystalline particle with the shape of a plate, comprising a plurality of crystal grains, wherein the number of crystal grains present in the thickness direction of the particle at any one point is substantially one, wherein the plurality of crystal grains are bonded together at grain boundaries with specific crystal planes being aligned, and wherein the degree of orientation of the plate-like polycrystalline particle measured by the Lotgering method is 25% or more.

2. The plate-like polycrystalline particle according to claim 1, wherein the crystal grains are composed of inorganic particles that grow into crystal grains with an isotropic and polyhedral shape and have a specific crystal plane.

3. The plate-like polycrystalline particle according to claim 1, wherein the aspect ratio of the plate-like polycrystalline particle is 2 or more.

4. The plate-like polycrystalline particle according to claim 1, wherein, in each crystal grain, the length in the surface direction of the plate-like polycrystalline particle is larger than the length in the thickness direction.

5. The plate-like polycrystalline particle according to claim 1, wherein the thickness of the crystal grains is 0.1 to 15 μm.

6. The plate-like polycrystalline particle according to claim 1, wherein the crystal grains are composed of inorganic particles that grow into crystal grains with an anisotropic shape.

7. The plate-like polycrystalline particle according to claim 1, wherein the crystal grains include an oxide represented by general formula $ABO_3$ as a main component, wherein the A site contains at least one element selected from the group consisting of Li, Na, K, Bi, and Ag, and the B site contains at least one element selected from the group consisting of Nb, Ta and Ti.

8. The plate-like polycrystalline particle according to claim 1, wherein the crystal grains include an oxide represented by general formula $ABO_3$ as a main component, wherein the A site contains Pb, and the B site contains at least one element selected from the group consisting of Mg, Zn, Nb, Ni, Ti and Zr.

9. The plate-like polycrystalline particle according to claim 7, wherein, in the crystal grains, the ratio of the A site to the B site, A/B, before firing is 1.0 to 1.3.

10. The plate-like polycrystalline particle according to claim 1, wherein the crystal grains are composed of an oxide having a perovskite structure.

11. A method for producing plate-like polycrystalline particles each including a plurality of crystal grains bonded together at grain boundaries with specific crystal planes being aligned, wherein the number of crystal grains present in the thickness direction of the particle at any one point is substantially one, and wherein the degree of orientation of the plate-like polycrystalline particle measured by the Lotgering method is 25% or more, the method comprising:

a shaping step of forming inorganic particles into a self-supported, sheet-like shaped body with a thickness of 15 µm or less;

a firing step of firing the shaped body with or without an inactive layer which does not substantially react with the shaped body being disposed adjacent to the shaped body; and a pulverizing step of crushing and classifying the fired shaped body by passing the fired shaped body through openings with a predetermined size.

12. The method for producing plate-like polycrystalline particles according to claim 11, wherein the inorganic particles used in the shaping step grow into crystal grains with an isotropic and polyhedral shape under predetermined firing conditions.

13. The method for producing plate-like polycrystalline particles according to claim 11, wherein the inorganic particles used in the shaping step grow into crystal grains with an anisotropic shape under predetermined firing conditions.

14. The method for producing plate-like polycrystalline particles according to claim 11, wherein the inorganic particles used in the shaping step form an oxide represented by general formula $ABO_3$, wherein the A site contains at least one element selected from the group consisting of Li, Na, K, Bi and Ag, and the B site contains at least one element selected from the group consisting of Nb, Ta and Ti.

15. The method for producing plate-like polycrystalline particles according to claim 14, wherein the inorganic particles used in the shaping step form an oxide represented by general formula $ABO_3$, wherein the A site contains at least one element selected from the group consisting of Li, Na and K, and the B site contains at least one element selected from the group consisting of Nb and Ta; and in the firing step, the shaped body is fired at a temperature of 900° C. to 1,250° C.

16. The method for producing plate-like polycrystalline particles according to claim 11, wherein the inorganic particles used in the shaping step form an oxide represented by general formula $ABO_3$, wherein the A site contains Pb, and the B site contains at least one element selected from the group consisting of Mg, Zn, Nb, Ni, Ti and Zr.

17. The method for producing plate-like polycrystalline particles according to claim 14, wherein the inorganic particles used in the shaping step form the oxide in which the ratio of the A site to the B site, A/B, is 1.0 to 1.3.

18. The method for producing plate-like polycrystalline particles according to claim 11, wherein the inorganic particles used in the shaping step form a perovskite structure.

19. The method for producing plate-like polycrystalline particles according to claim 11, wherein the inorganic particles used for forming the shaped body in the shaping step have a median diameter that is 1% to 60% of the thickness of the shaped body.

20. The method for producing plate-like polycrystalline particles according to claim 11, wherein, in the firing step, the shaped body is fired in a volatilization-suppressing state in which volatilization of a specific component contained in the shaped body is suppressed.

21. The method for producing plate-like polycrystalline particles according to claim 20, wherein, in the firing step, the shaped body is fired in the volatilization-suppressing state in the presence of other inorganic particles than those constituting the shaped body.

22. The method for producing plate-like polycrystalline particles according to claim 11, wherein, in the pulverizing step, the fired shaped body is crushed and classified by passing through open openings with the predetermined size of 1.0 mm or less.

23. The method for producing plate-like polycrystalline particles according to claim 11, wherein, in the pulverizing step, the fired shaped body is crushed and classified by passing through a mesh with openings with the predetermined size by being pressed with a pressing member.

24. A method for producing a crystallographically-oriented ceramic in which crystals are oriented comprising:

a mixing step of mixing plate-like polycrystalline particles, each according to claim 1, and raw material powder;

a second shaping step of forming the mixture into a predetermined secondary shaped body in which the plate-like polycrystalline particles are oriented in a predetermined direction; and a second firing step of firing the secondary shaped body so that the raw material powder is oriented in the direction in which the plate-like polycrystalline particles are oriented.

* * * * *

UNITED STATES PATENT AND TRADEMARK OFFICE
CERTIFICATE OF CORRECTION

PATENT NO. : 8,158,255 B2
APPLICATION NO. : 12/017567
DATED : April 17, 2012
INVENTOR(S) : Shohei Yokoyama, Nobuyuki Kobayashi and Tsutomu Nanataki It is certified that error appears in the above-identified patent and that said Letters Patent is hereby corrected as shown below:

Title Page, Item (56) References Cited, Other Publications: please change "Yasuyoshi Saito et al., *"Synthesis of Polycrystalline Platelike $KNbO_3$ Particles by the Topochemical Micro-Crystal Conversion Method and Fabrication of Grain-Oriented $(K_{0.5}Na_{0.3})$ $NbO_3$ Ceramics*," Journal of the European Ceramic Society, Elsevier Science Publishers, Barking, Essex, GB, Vol. 27, No. 13-15, 1 January 2007, pp. 4087-4092"
to
--Yasuyoshi Saito et al., *"Synthesis of Polycrystalline Platelike $KNbO_3$ Particles by the Topochemical Micro-Crystal Conversion Method and Fabrication of Grain-Oriented $(K_{0.5}Na_{0.5})$ $NbO_3$ Ceramics*," Journal of the European Ceramic Society, Elsevier Science Publishers, Barking, Essex, GB, Vol. 27, No. 13-15, 1 January 2007, pp. 4087-4092--

Column 24
 *Line 26*: please delete "open"

Signed and Sealed this
Third Day of July, 2012

David J. Kappos
*Director of the United States Patent and Trademark Office*